(12) United States Patent
Klein et al.

(10) Patent No.: US 10,951,749 B2
(45) Date of Patent: Mar. 16, 2021

(54) METHOD AND SYSTEM FOR RAPID AWARENESS, RECOGNITION, AND RESPONSE TO DIGITAL MESSAGES

(71) Applicant: BKLK Ltd., Herzlia (IL)

(72) Inventors: Ben-Zion Klein, Herzlia (IL); Israel Belfer, Efrat (IL); Ehud Spiegel, Petach-Tikva (IL)

(73) Assignee: BKLK Ltd., Herzlia (IL)

( * ) Notice: Subject to any disclaimer, the term of this patent is extended or adjusted under 35 U.S.C. 154(b) by 517 days.

(21) Appl. No.: 15/371,644

(22) Filed: Dec. 7, 2016

(65) Prior Publication Data

US 2017/0099590 A1 Apr. 6, 2017

Related U.S. Application Data

(63) Continuation of application No. 12/811,220, filed as application No. PCT/IL2008/001699 on Dec. 30, 2008.

(Continued)

(51) Int. Cl.
*H04M 1/72436* (2021.01)
*H04M 1/64* (2006.01)
(Continued)

(52) U.S. Cl.
CPC ........ *H04M 1/72436* (2021.01); *H04L 51/02* (2013.01); *H04L 51/18* (2013.01);
(Continued)

(58) Field of Classification Search
CPC ..... H04W 4/14; H04M 1/72436; H04M 1/64; H04L 51/02; H04L 51/18; H04L 51/34;
(Continued)

(56) References Cited

U.S. PATENT DOCUMENTS

| | | |
|---|---|---|
| 5,153,582 A | 10/1992 | Davis |
| 5,875,403 A | 2/1999 | Christal |

(Continued)

FOREIGN PATENT DOCUMENTS

| | | |
|---|---|---|
| EP | 1065899 A1 | 1/2001 |
| EP | 0801512 B1 | 5/2006 |
| WO | 1997020443 A1 | 6/1997 |

OTHER PUBLICATIONS

Foreign Office Action for European Patent Application No. 08866620.1 dated Sep. 9, 2016 by the European Patent Office.

(Continued)

*Primary Examiner* — Dinh Nguyen
(74) *Attorney, Agent, or Firm* — M&B IP Analysts, LLC

(57) ABSTRACT

Apparatus for constructing a digital telephone message including a message defining unit, configured for allowing a sender to define a message for sending to a recipient, and a response defining unit, configured for allowing the sender to predefine a recipient response, and to include the predefined recipient response in the message for activation at the recipient. Apparatus for receiving a digital telephone message, the message including an activatable sender-defined response, the apparatus including a receiving unit for receiving the message, a notification unit for notifying a recipient of the arrival of the message, and a response activation unit for displaying the sender-defined response, and associating the sender-defined response with a user action for providing user input to send the response. Related apparatus and methods are also described.

21 Claims, 10 Drawing Sheets

Related U.S. Application Data

(60) Provisional application No. 61/006,222, filed on Dec. 31, 2007.

(51) Int. Cl.
  *H04W 4/14* (2009.01)
  *H04L 12/58* (2006.01)
  *H04L 29/06* (2006.01)

(52) U.S. Cl.
  CPC .............. *H04L 51/34* (2013.01); *H04L 51/36* (2013.01); *H04L 51/38* (2013.01); *H04L 63/08* (2013.01); *H04L 63/10* (2013.01); *H04M 1/64* (2013.01); *H04W 4/14* (2013.01); *H05K 999/99* (2013.01)

(58) Field of Classification Search
  CPC ......... H04L 51/36; H04L 51/38; H04L 63/08; H04L 63/10; H05K 999/99
  See application file for complete search history.

(56) References Cited

U.S. PATENT DOCUMENTS

| | | | |
|---|---|---|---|
| 5,995,594 A | 11/1999 | Shaffer et al. | |
| 7,221,953 B2 | 5/2007 | Roche | |
| 7,412,486 B1 | 8/2008 | Petrack et al. | |
| 7,620,407 B1* | 11/2009 | Donald ................... | H04L 51/38 455/466 |
| 7,668,918 B2 | 2/2010 | Diddee et al. | |
| 2001/0056410 A1 | 12/2001 | Ishigaki | |
| 2002/0046249 A1 | 4/2002 | Shiigi | |
| 2002/0120779 A1 | 8/2002 | Teeple et al. | |
| 2002/0172367 A1 | 11/2002 | Mulder et al. | |
| 2003/0078033 A1 | 4/2003 | Sauer et al. | |
| 2003/0110275 A1* | 6/2003 | Banerjee ............... | H04L 41/145 709/230 |
| 2004/0044583 A1 | 3/2004 | Thibault | |
| 2004/0068545 A1 | 4/2004 | Daniell et al. | |
| 2004/0078441 A1 | 4/2004 | Malik et al. | |
| 2004/0137884 A1* | 7/2004 | Engstrom ............... | H04L 51/16 455/414.1 |
| 2004/0186889 A1 | 9/2004 | Washburn | |
| 2005/0071632 A1 | 3/2005 | Pauker et al. | |
| 2005/0091314 A1 | 4/2005 | Blagsvedt et al. | |
| 2005/0114533 A1 | 5/2005 | Hullfish et al. | |
| 2005/0119017 A1 | 6/2005 | Lovell et al. | |
| 2006/0026256 A1 | 2/2006 | Diddee et al. | |
| 2006/0075351 A1 | 4/2006 | Brumfield | |
| 2006/0195506 A1 | 8/2006 | Deng | |
| 2006/0240857 A1 | 10/2006 | Yoshimachi | |
| 2006/0276210 A1 | 12/2006 | Thomas et al. | |
| 2007/0011258 A1 | 1/2007 | Khoo | |
| 2007/0027717 A1 | 2/2007 | Karamchedu et al. | |
| 2007/0054679 A1 | 3/2007 | Cho et al. | |
| 2008/0055269 A1* | 3/2008 | Lemay .................. | G06F 3/0482 345/173 |
| 2008/0062133 A1 | 3/2008 | Wolf | |
| 2008/0085675 A1 | 4/2008 | Rao | |
| 2008/0263158 A1 | 10/2008 | Cacho et al. | |
| 2009/0054038 A1 | 2/2009 | Ranjan et al. | |
| 2009/0172103 A1 | 7/2009 | Tuli | |
| 2010/0048231 A1 | 2/2010 | Donald et al. | |

OTHER PUBLICATIONS

Notification of Defects referring to Israeli Patent Application No. 206,697, Israel Patent Office, Dated: Aug. 3, 2015.
Notification of Defects referring to Israeli Patent Application No. 206,697, Israel Patent Office, Dated: Jan. 26, 2015.
Notification of Defects referring to Israeli Patent Application No. 206,697, Israel Patent Office, Dated: Jun. 17, 2013.
Palm, "How Does Sms Works'?", Customer Support Knowledge Library, www. palm.com, Article ID: 36350, 2 P., 2007.
Requisition by the Examiner dated Aug. 2015 from the Canadian Intellectual Property Office re: Application No. 2,711,164.
The International Search Report and the Written Opinion for PCT/IL2008/001699, ISA, dated Apr. 29, 2009.
Examination Report for EP 08866620.1-1857 dated May 24, 2017 from the European Patent Office, Communication pursuant to Article 94(3) EPC, EPO, Netherlands.
Notification Before Refusal dated Dec. 18, 2016 for Israeli Patent Application No. 206697, issued from the Israel Patent Office.
The First Examination Report for Indian Patent Application No. 1414/MUMNP/2010 dated Jun. 21, 2017 from the the Patent Office, Intellectual Property India, Mumbai.
Communication Pursuant to Article 94(3) EPC for EP Application No. 08866620.1 dated Mar. 21, 2018, EPO, Netherlands.

\* cited by examiner

METHOD AND SYSTEM FOR RAPID AWARENESS, RECOGNITION, AND RESPONSE TO DIGITAL MESSAGES

CROSS-REFERENCE TO RELATED APPLICATIONS

This application is a continuation of U.S. patent application Ser. No. 12/811,220 filed on Jun. 30, 2010, which is the national phase of International Application No. PCT/IL08/01699 filed on Dec. 30, 2008. The PCT/IL08/01699 Application claims the benefit of U.S. Provisional Patent Application No. 61/006,222 filed on Dec. 31, 2007. The contents of the above-referenced applications are hereby incorporated by reference.

FIELD OF THE INVENTION

The present invention, in some embodiments thereof, relates to a method for rapid acknowledgement of awareness to messages, and, more particularly, but not exclusively, to a method for one-click acknowledgement of digital messages, receipt and/or content thereof.

BACKGROUND OF THE INVENTION

Microsoft provides the following service within the Outlook application. A person receiving a meeting invitation can press ACCEPT or DECLINE, thereby providing a response to the sender. In order to press ACCEPT or DECLINE, the person must either open the invitation, or use an Outlook function named preview, which displays at least some of the invitation, in a preview window.

Amazon.com provides a one-click purchasing service, described in U.S. Pat. No. 5,960,411 to Hartman et al. An order is placed by a purchaser at a client system and received by a server system. The server system receives purchaser information including identification of the purchaser, payment information, and shipment information from the client system. The server system then assigns a client identifier to the client system and associates the assigned client identifier with the received purchaser information. The server system sends to the client system the assigned client identifier and an HTML document identifying the item and including an order button. The client system receives and stores the assigned client identifier and receives and displays the HTML document. In response to the selection of the order button, the client system sends to the server system a request to purchase the identified item. The server system receives the request and combines the purchaser information associated with the client identifier of the client system to generate an order to purchase the item in accordance with the billing and shipment information whereby the purchaser effects the ordering of the product by selection of the order button.

Seppanen et al describe a mobile terminal having one key user message acknowledgment function in U.S. Pat. No. 5,692,032, assigned to Nokia Mobile Phones Ltd. Seppanen describes a cellular radiotelephone which includes a keypad having a plurality of keys and a display device for displaying information, including messages, to a user. A method includes the steps of: (a) transmitting a short message service (SMS) message from a network to the cellular radiotelephone; (b) receiving the SMS message from the network and storing the message in a memory of the cellular radiotelephone; (c) presenting the stored SMS message to a user; (d) determining if the presented SMS message requires a manual acknowledgment by the user and, if so, monitoring an output of the keypad to detect a single key depression by the user. The method further includes a step of (e) determining if the user's single key depression is a correct manual acknowledgement and, if so, automatically generating and transmitting to the network a SMS manual acknowledgement message that includes an identification of the single key depressed by the user.

Additional background art includes:
U.S. Pat. No. 5,153,582 to Davis.
U.S. Pat. No. 6,188,909 to Alanara et al.
U.S. Pat. No. 6,262,735 to Etelapera.
U.S. Pat. No. 6,370,389 to Isomursu et al.
U.S. Pat. No. 7,221,953 to Roche.

SUMMARY OF THE INVENTION

Embodiments of the invention enable rapid awareness, identification and response to digital messages.

An initiator of a digital message is often, after sending the message, is in the dark about the awareness of a receiver to the message. The transmitter used by the initiator is typically in the same state after receiving a response as it was after sending the message.

A person receiving, by way of a non-limiting example, an SMS message, may wish to respond to the message when he gets it, with the least amount of effort. In some embodiments of the invention, the person that received the message responds with a reception/non-reception flag within an agreed iconic flagging system, such as an icon of an empty envelope that gets marked with suitable reception icons.

Sometimes, when a person receives an SMS (Short Message Service) message, the person is occupied, and desirous of finishing whatever task is involved with answering the message with as little fuss as possible. Sometimes the person is expecting a message, and an acknowledgement of receiving the message is what is needed. In some embodiments of the present invention, the person is enabled top perform the above acknowledgement.

When a person receives a digital message, embodiments of the invention enable responding to the digital message optionally without reading the message. The person identifies a sender of the message, and based thereon sends a response, be it as simple as an iconic acknowledgement of receipt. The person optionally identifies the message by a title of the message, and bases the response on the title.

The initiator of a digital message, after sending the message, and using embodiments of the invention, is made aware of a response to the message, and can track responses by more than one recipient of a message, as well as track more than one message.

Embodiments of the invention enable bringing about an efficient and speedy state of awareness, both at the receiving end and at the sending end, thereby saving time and/or energy and/or money. Some embodiments of the invention enable message response even without opening the message, because the type of message is immediately indicated, and the response is available before opening.

Some embodiments of the invention enable a receiving apparatus to alert a user that a message has arrived with a response request.

Some embodiments of the invention enable a user of the receiving apparatus to respond with a one-click message response.

Some embodiments of the invention enable the user to select between a plurality of responses as the message response.

Some embodiments of the invention enable the user to respond without interrupting a telephone conversation on the receiving apparatus.

Other embodiments of the invention enable producing a message which can be responded to without opening the message.

Still other embodiments of the invention enable embedding response options within the message.

Other embodiments of the invention enable tracking a response to the message.

Some embodiments of the invention enable tracking more than one response to the message.

Some embodiments of the invention implement the features using add-on software in apparatus sending and/or in apparatus receiving the messages.

Some embodiments of the invention enhance native software in the sending and/or the receiving apparatus in order to implement the features.

Some embodiments of the invention include predefined responses in a receiver's software, and send messages which contain indications which predefined response, or responses, are to be available in the message. Other embodiments of the invention send the entire predefined responses with the message.

Some embodiments of the present invention enhance infrastructure software used by messaging service providers in order to enable transfer of messages with embedded pre-defined responses.

According to an aspect of some embodiments of the invention there is provided an apparatus for constructing a digital telephone message including a message defining unit, configured for enabling a sender to define a message for sending to a recipient, and a response defining unit, configured for allowing the sender to predefine a recipient response, and to include the predefined recipient response in the message for activation at the recipient.

According to some embodiments of the invention, the message includes an SMS (Short Message Service) message. According to some embodiments of the invention, the message includes a text message. According to some embodiments of the invention, the message includes a multimedia messaging service (MMS) message.

According to some embodiments of the invention, the response defining unit is configured for allowing a sender to predefine more than one recipient response. According to some embodiments of the invention, the response defining unit is configured for allowing a sender to select the predefined recipient response from a menu of predefined recipient responses.

According to some embodiments of the invention, the predefined recipient response includes text. According to some embodiments of the invention, the predefined recipient response includes text using a predetermined convention. According to some embodiments of the invention, the predefined recipient response includes text conforming to a mark-up language.

According to some embodiments of the invention, the activation at a recipient includes sending the predefined recipient response to a response recipient. According to some embodiments of the invention, the activation at the recipient occurs after a pre-defined period of time, if the recipient did not perform the activation after the pre-defined period of time. According to some embodiments of the invention, the activation at a recipient includes making an immediate call to the sender. According to some embodiments of the invention, the immediate call is to a voice mail number.

According to some embodiments of the invention, the activation is performed by a single action.

According to some embodiments of the invention, the response recipient includes the sender of the message. According to some embodiments of the invention, the response recipient includes a third party other than the sender of the message. According to some embodiments of the invention, the response recipient includes more than one response recipient.

According to some embodiments of the invention, the response defining unit further provides for allowing the sender to include code configured to run upon the recipient's apparatus to support caller defined responses. According to some embodiments of the invention, the code is configured to activate sending the predefined recipient response.

According to some embodiments of the invention, and further including an authentication defining unit for allowing the sender to define a required authentication, thereby to limit display of the message to recipients who input the defined authentication. According to some embodiments of the invention, the form of authentication includes at least one of the group consisting of a Personal Identification Number (PIN) and biometric identification.

According to an aspect of some embodiments of the present invention there is provided a method for constructing a digital telephone message including constructing the message, predefining a recipient response, and including the predefined recipient response with the constructed message for automatic activation at a recipient.

According to an aspect of some embodiments of the present invention there is provided a server configured to transmit a digital telephone message including a sender-defined response component for activation by a recipient.

According to an aspect of some embodiments of the present invention there is provided a method for producing a digital message containing a component which enables responding to the message upon receipt, without a need for any one of selecting, opening, and reading the message.

According to an aspect of some embodiments of the present invention there is provided a communication system for transmitting a digital message containing a component which enables responding to the message upon receipt, without a need for any one of selecting, opening, and reading the message.

According to an aspect of some embodiments of the present invention there is provided apparatus for receiving a digital telephone message, the message including an activatable sender-defined response, the apparatus including a receiving unit for receiving the message, a notification unit for notifying a recipient of the arrival of the message, and a response activation unit for displaying the sender-defined response, and associating the sender-defined response with a user action for providing user input to send the response.

According to some embodiments of the invention, at least the response activation unit is part of an enhanced native SMS client software.

According to some embodiments of the invention, the enhanced native SMS client software is adapted to parse a plain text message, and performs the displaying and the associating based, at least in part, on the parsing.

According to some embodiments of the invention, the response activation unit is configured to enable a recipient to respond to the received message in one of the manners from the group consisting of not responding, responding by sending text, responding by activating the sender-defined response, and responding by sending a second sender-defined response, the second sender-defined response being produced at the recipient's apparatus for receiving a digital telephone message.

According to some embodiments of the invention, the message includes at least one of the group consisting of a text message, a multimedia message, an SMS (Short Message Service) message, and a multimedia messaging service (MMS) message.

According to some embodiments of the invention, the response activation unit is configured to enable a recipient to respond to the received message without interrupting a telephone conversation on the receiving apparatus.

According to some embodiments of the invention, the notification unit is configured to notify the recipient of the arrival of the message differently than to notify the recipient of the arrival of a message which does not include an activatable sender-defined response.

According to some embodiments of the invention, the user action includes selecting the sender-defined response from a plurality of sender-defined responses. According to some embodiments of the invention, the selecting includes selecting from a menu.

According to some embodiments of the invention, the user action includes a single key depression. According to some embodiments of the invention, the user action includes a single mouse click. According to some embodiments of the invention, the user action includes a single voice command.

According to some embodiments of the invention, the user action includes activating code received with the message. According to some embodiments of the invention, the user action includes activating a script received with the message. According to some embodiments of the invention, the user action includes activating a widget received with the message.

According to some embodiments of the invention, the user action activates the apparatus to send the response. According to some embodiments of the invention, the sending the response includes sending the response to the sender.

According to some embodiments of the invention, the user action is operable to activate the apparatus to send the response before opening the message.

According to some embodiments of the invention, and further including a message display unit for displaying the message, the display unit displaying the message only after the recipient inputs a form of authentication. According to some embodiments of the invention, the form of authentication includes at least one of the group consisting of a Personal Identification Number (PIN) and biometric identification.

According to some embodiments of the invention, the sending the response includes sending the response to a third party other than the sender of the message, the third party destination having been received with the message.

According to an aspect of some embodiments of the present invention there is provided a method for receiving a digital telephone message, the message including an activatable sender-defined response, the method including receiving the message, notifying a recipient of the arrival of the message, and displaying the sender-defined response, and associating the sender-defined response with a user action for providing user input to send the response.

According to some embodiments of the invention the message includes a plurality of activatable sender-defined responses and the displaying includes displaying a partial set of the sender-defined responses at a time. According to some embodiments of the invention the user action causes a display of an additional partial set of sender-defined responses. According to some embodiments of the invention the additional partial set of sender-defined responses is selected to be displayed based, at least in part, on the user action.

According to some embodiments of the invention the method further includes sending responses based, at least in part, on the user actions.

According to an aspect of some embodiments of the present invention there is provided a method for tracking responses to a digital telephone message, the message including an activatable sender-defined response, including receiving a response to a sent message, and displaying a recipient identifier associated with the sent message together with a response identifier associated with the sent message, the response identifier including an indication of whether a response to the message was received.

According to some embodiments of the invention, the response identifier includes text. According to some embodiments of the invention, the response identifier includes an icon.

According to some embodiments of the invention, and further including producing an alert indicating that a response has been received.

According to some embodiments of the invention, and further including producing an alert indicating a message to which a response has not been received within a specified time.

According to some embodiments of the invention, and further including automatically resending a message to which a response has not been received within a specified time.

According to some embodiments of the invention, and further including displaying how much time has passed since sending a message, if a response has not been received for the message.

According to some embodiments of the invention, the sent message was sent to a plurality of recipients, and the displaying includes displaying the message identifier associated with the sent message, displaying a plurality of recipient identifiers, each associated with one of the plurality of recipients, and displaying a plurality of response identifiers, each associated with one of the plurality of recipients, indicating whether the recipient responded to the message, and if yes, an indication of the response.

According to some embodiments of the invention, the sent message was sent to a plurality of recipients, and the displaying includes displaying a plurality of response identifiers, each of the response identifiers associated with one type of response to the sent message, and displaying how many responses of the one type of response were received.

According to some embodiments of the invention, the receiving includes receiving more than one response to more than one sent message.

According to some embodiments of the invention, the displaying includes displaying how many responses were received for each one of the more than one sent message. According to some embodiments of the invention, the displaying includes displaying a response identifier for each message/recipient combination, and the response identifier includes a first field associated with the recipient and a second field associated with the message and the type of response. According to some embodiments of the invention, the displaying includes displaying how many responses of each type of response were received for each one of the more than one sent message.

According to an aspect of some embodiments of the present invention there is provided a system for tracking responses to sent messages including a receiving unit for receiving a response to a sent message, and a display for displaying a message identifier associated with the sent message together with a response identifier associated with the response, the response identifier including an indication of whether a response to the message was received.

According to an aspect of some embodiments of the present invention there is provided a system for sending a message over a cellular link and tracking responses to the message, the system including a message defining unit for defining the message, a response defining unit for predefining one or more recipient responses, and for including the one or more predefined recipient responses in the message for activation at a recipient, a tracking unit for tracking responses to the message, and for displaying responses to the message.

According to some embodiments of the invention, the message includes an SMS (Short Message Service) message.

According to some embodiments of the invention, the message is sent to a plurality of recipients.

According to some embodiments of the invention, the displaying displays each response to the message. According to some embodiments of the invention, the displaying displays a summary of the responses.

According to some embodiments of the invention, the tracking unit is configured to track a plurality of different messages.

According to an aspect of some embodiments of the present invention there is provided a communication system for transmitting an SMS message to which a flag has been added, the flag indicating that one or more pre-defined responses are included in an SMS message.

According to an aspect of some embodiments of the present invention there is provided a communication system for transmitting an SMS message to which a field has been added, the field including one or more pre-defined responses.

According to an aspect of some embodiments of the present invention there is provided apparatus for receiving a first digital telephone message and for constructing a second digital telephone message, including a receiving unit for receiving the first digital telephone message, a message defining unit, configured for allowing a user to define a message for sending to a recipient, and a response defining unit, configured for allowing the user to predefine a response, and to include the predefined response in the message for activation at the recipient, thereby constructing a second digital telephone message.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how some embodiments of the invention may be practiced.

In the drawings.

DESCRIPTION OF EMBODIMENTS OF THE INVENTION

Figure 1A:
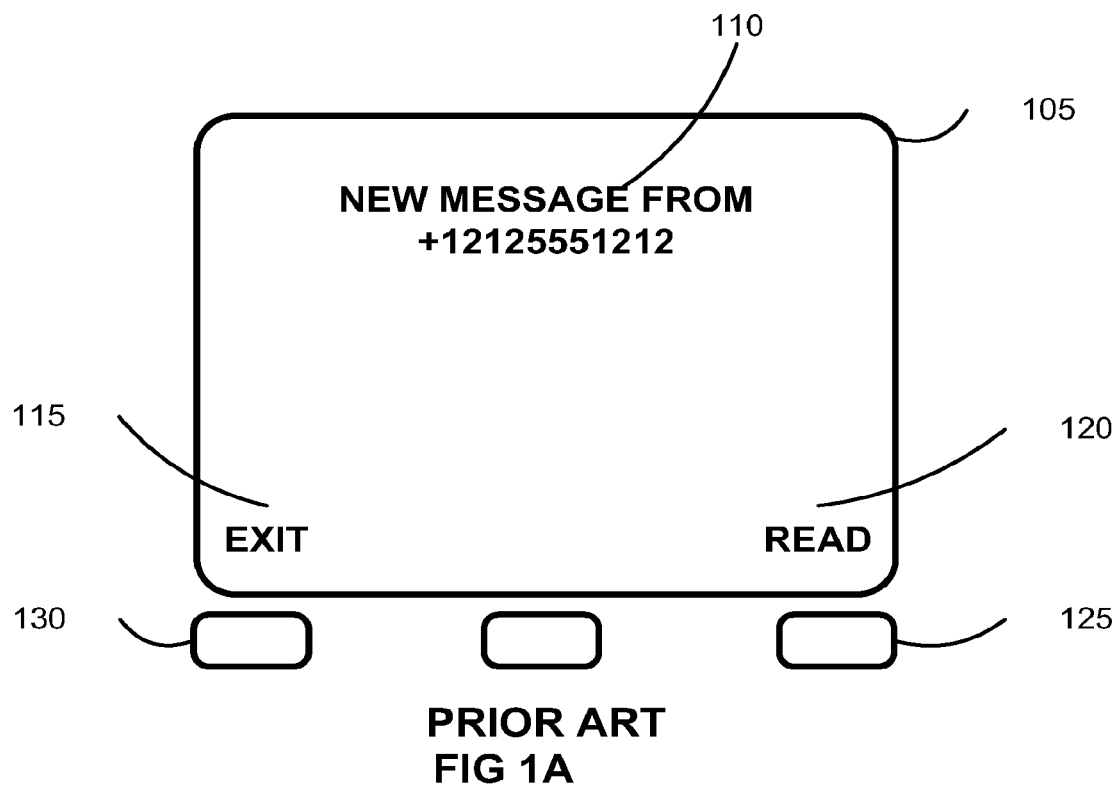
FIG. 1A is a simplified pictorial illustration of a cellular telephone screen showing a notification that a message has been received according to an exemplary prior art method.

The present invention, in some embodiments thereof, relates to a method for rapid acknowledgement of awareness to messages, and, more particularly, but not exclusively, to a method for acknowledgement of digital messages, receipt and/or content thereof.

The description provided in the Summary, of finishing whatever task is involved with answering an SMS message with as little fuss as possible, possibly without even opening the message, is an example of a use for an exemplary embodiment of the invention.

It is to be appreciated that within the present specification and claims, language will be used referring to digital messaging, particularly phone messaging, text messaging, and phone text messaging over cellular connections, for example using the short messaging service SMS protocol. Digital messaging contemplated includes: SMS messages to cellular telephones; MMS (Multimedia Message Service) messages to cellular telephones; Voice Mail messages to cellular telephones; email messages; mail messages to digital television receivers over satellite, cable, or IP network; Instant Messaging (IM) messages; Voice Mail messages to line phones; personal paging device (beeper) messages; DECT (Digital Enhanced Cordless Telecommunications) phone messages; and so on.

The invention, in embodiments thereof, is intended to apply to forms of transmission of digital messages, including, by way of non-limiting examples: cellular telephony; line telephony; satellite; cable; IP network; Bluetooth; WiMax; Infrared; wireless networks, and so on.

Continuing with the SMS example, a person receives an SMS message, and without reading the body of the message, identifies the sender, and performs an action of sending an acknowledgement of receiving the message. The acknowledgement, by a human pressing a cellular telephone key, conveys more information to a sender than an indication that the message was technically received by the handset of the recipient. The human acknowledgement conveys that the person knows that a message has been received, as opposed to the person having simply left the handset ON and forgotten somewhere or indeed the handset currently being switched off.

A feature of some embodiments of the invention involves including response options in a message such that the response options are visible to the recipient without the recipient opening the message. The recipient receives an understanding of the response options together with an initial notification of having received a message. Forms of presenting the response options will be described further below, with reference to FIGS. 2A and 2B.

By virtue of a flag, icon, or similar visual indicator, attached to the message, the recipient knows more than just what his response options are. The recipient learns of the request for a response to the message and learns of what type of message has been received. By way of a non-limiting example, icon types displayed on the cell phone screen indicate: life/death situations; monetary issues; advertising; and so on. The fact that there are pre-defined options for response and the awareness of the recipient to the content enable the rapid response.

A feature of some embodiments of the invention involves selecting a response from a menu of responses, and in one click sending the response.

Figure 1B:
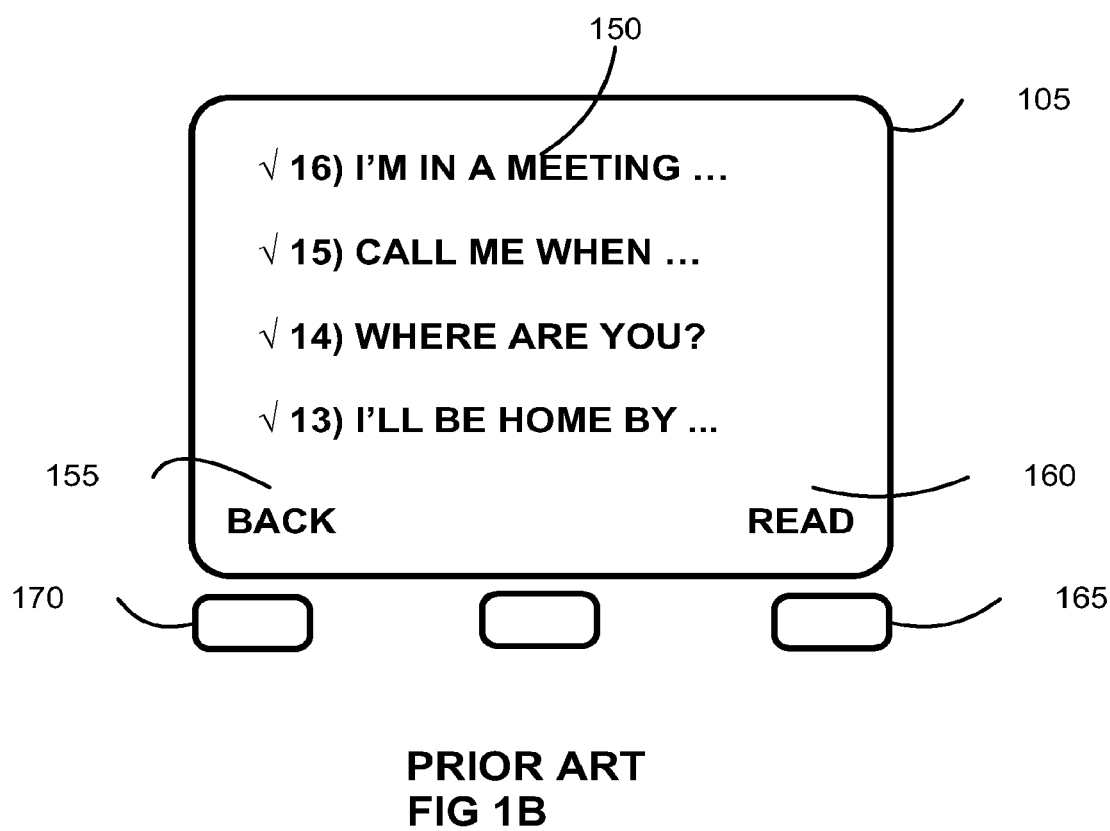
FIG. 1B is a simplified pictorial illustration of a cellular telephone screen showing a list of sent messages according to an exemplary prior art method.

For purposes of better understanding some embodiments of the present invention, as illustrated in FIGS. 2A, 2B, 4A, 4B and 5A-5D of the drawings, reference is first made to the construction and operation of a conventional (i.e., prior art) methods for receiving messages and tracking sent messages, as illustrated in FIGS. 1A and 1B. FIGS. 1A and 1B also use the example of SMS messaging on cellular telephones, as a non-limiting example.

Reference is now made to FIG. 1A, which is a simplified pictorial illustration of a cellular telephone screen 105 showing a notification 110 that a message has been received according to an exemplary prior art method. Typically the notification 110 conveys the fact that a message has been received, and from which sender. The sender is identified by a phone number, or, if the phone number is included in the recipient's address book, by a name. Typically, the options before the recipient are to READ 120 the message, and to EXIT 115 the notification screen.

The recipient selects one of the options, and presses a handset button associated with a selected option. By way of the above example, a first key 125 on the right bottom of the cellular telephone screen 105 is associated with the READ 120 option, and a second key 130 on the left bottom of the cellular telephone screen 105 is associated with the EXIT 115 option.

Reference is now made to FIG. 1B, which is a simplified pictorial illustration of a cellular telephone screen 105 showing a list of sent messages 150 according to an exemplary prior art method. Typically the list of sent messages

150 displays a few messages, and occasionally also indicates whether the messages have been received by a service provider, for sending to recipients' handsets. The indications of whether the messages have been received by the service provider are depicted in the example of FIG. 1B as √ symbols. The list of sent messages is often called an outbox.

The sender, when viewing the list of sent messages 150, also has optional actions, typically comprising BACK 155 and READ 160, as well as scrolling through the list of sent messages 150. The scrolling is usually effected by one or more navigation controls (not shown). By way of the above example, a first key 165 on the right bottom of the cellular telephone screen is associated with the READ 160 option, and a second key 170 on the left bottom of the cellular telephone screen 105 is associated with the BACK 155 option.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2A:
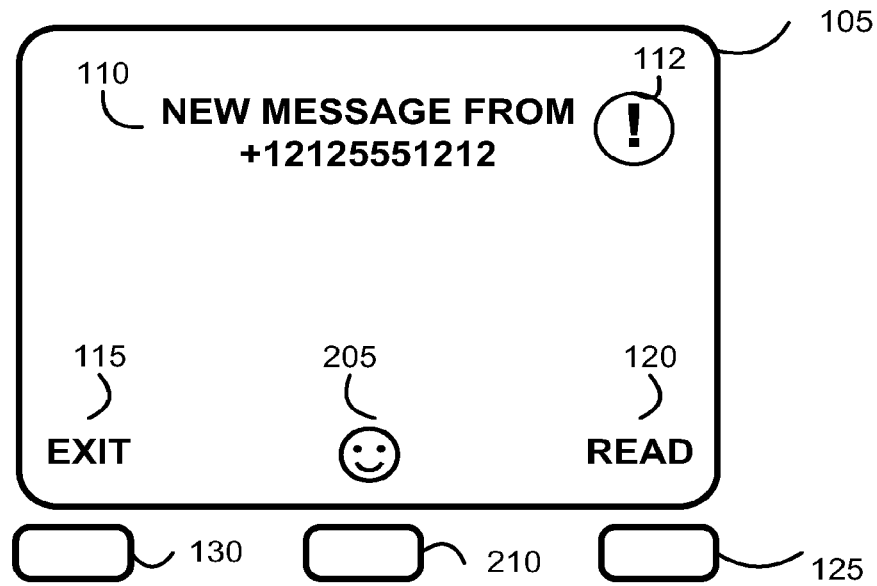
FIG. 2A is a simplified pictorial illustration of a cellular telephone screen showing a notification that a message has been received according to a system constructed and operative in accordance with an exemplary embodiment of the present invention.

Reference is now made to FIG. 2A, which is a simplified pictorial illustration of a cellular telephone screen 105 showing a notification 110 that a message has been received according to a system constructed and operative in accordance with an exemplary embodiment of the present invention.

The notification 110 conveys the fact that a message has been received, and from which sender. The sender is identified by a phone number, or, if the phone number is included in the recipient's address book, by a name.

An optional flag 112 is depicted, drawing attention to the fact that the received message contains a pre-defined response. The flag 112 optionally comprises one or more icons, which together optionally convey that a pre-defined response is available; that a response is desired; that a response is required, and so on. By way of a non-limiting example, the available/desired/required may be portrayed as the following icons respectively ☺ ⓘ ⓘ. The flag 112 produces increased awareness of a receiver to the fact that the message received comprises a pre-defined response. The flag 112 conveys information that the message comprises a pre-defined response, and comprises a request for the receiving user to activate the response.

Some embodiments of the invention include emphasis on the flag 112, such as, by way of a non-limiting example, displaying a circle around the flag 112, displaying a blinking flag 112, and so on.

The options before the recipient, similarly to the depiction of FIG. 1A, are to READ 120 the message, and to EXIT 115 the notification screen. An additional option is offered to the recipient, to ACK ☺ 205 the message, that is, to acknowledge receiving the message.

Some embodiments of the invention alert the recipient that the message has arrived. The alert is optionally different from an alert when a message has arrived which does not require a response. The alert optionally includes a ring-tone or other sound, a vibration, and other suitable alerting methods. The alert for a message which requires a response and displays a flag is optionally different from the alert for a message which requires a response and does not display a flag. The flag is a form of visual alert, which is optionally combined with, or not combined with, other forms of alert such as the above mentioned ring-tone.

As in the depiction of FIG. 1A, a first key on the right bottom of the cellular telephone screen 105 is associated with the READ 120 option, and a second key 130 on the left bottom of the cellular telephone screen 105 is associated with the EXIT 115 option. In addition to the depiction of FIG. 1A, a third key 210 is associated with the ACK 205 option. The third key 210 is optionally a joystick, or navigation key.

It is to be appreciated that the receiving user is made aware of the fact that the message comprises a pre-defined response, and is provided with a way to activate the response, before the message is opened. The receiving user sees who the message is sent from, and is provided with an indication of what to do in order to respond. In the example of FIG. 2A, the "what to do" is to press the third key 210 in order to ACK 205.

In some embodiments of the invention there is a known convention between the sender and the recipient. The flag provides a hint that a response, which is a part of the convention, is requested.

The recipient can choose one of the three options, by selecting one of the three keys: READ 120, which opens the message and allows the recipient to read the message, EXIT 115, which exits the message notification screen, and ACK 205, which activates sending an ACKNOWLEDGE response to the sender.

Adding the ACK 205 option therefore enables the recipient to convey some response to the sender, even before reading the message. The ability is performed using a single key press. It is to be appreciated that the ACK 205 option may be associated with any of the cell phone keys or other input options.

Some embodiments of the invention highlight the ACK 205 option, thereby drawing the recipient's attention to the fact that a response is requested. The highlight is optionally performed by a different colored background; by flashing the ACK 205 option; and other suitable methods of emphasizing a specific display.

Non-limiting examples of highlighting the fact that a response option exists include flashing the ACK 205 option, displaying the ACK 205 option with a different background, underlining the ACK 205 option, drawing a circle around the ACK 205 option, adding text to the notification 110, adding the optional flag 112, and displaying the ACK 205 in a different color than other screen items.

Optionally, the enablement of the ACK 205 response capability is maintained even when the recipient opens the message using the READ 120 option, and advances to a different screen for reading the message.

Some embodiments of the invention use icons to indicate the options of EXIT, ACK, and READ.

Some embodiments of the invention, implemented on touch screen cellular telephones, do not need separate text or icons and separate keys, but rather have text or icons displayed as soft keys displayed on the touch screen.

Some embodiments of the invention, implemented on Braille enabled devices have text or icons displayed in a suitable Braille interface.

Some exemplary embodiments of the invention comprise a cellular telephone receiving an SMS (Short Message Service) message. Some exemplary embodiments of the invention comprise a cellular telephone receiving an email message. Some exemplary embodiments of the invention comprise a computer or a PDA (Personal Digital Assistant) receiving an email message.

In some exemplary embodiments of the invention the notification 110, also termed a message identifier, comprises a subject field, such as, by way of a non-limiting example, is found in email messages.

In some exemplary embodiments of the invention the notification 110, also termed a message identifier, identifies the message sender. By way of a non-limiting example, identifying the message sender of a cellular telephone message is typically performed by displaying the phone number of the message sender, or a nickname, stored in the receiver's cellular telephone, corresponding to the phone number of the message sender. By way of another non-limiting example, identifying the message sender of an email message is typically performed by displaying the email address of the message sender.

In some exemplary embodiments of the present invention identifying the message sender is first performed in a succinct manner, such as described above, that is the phone number of the message sender or similar manner. The receiving user is enabled to select the succinct identification and expand the succinct identification revealing more information about the message sender, including more communication options with the sender.

In some exemplary embodiments of the invention the notification 110 is not, as depicted, a visual notification, but rather a sound notification. In other exemplary embodiments the notification 110 includes both visual and auditory notification. The sound notification optionally comprises an indication that a response is requested for the message. The sound notification can optionally comprise an identification of the message sender, by suitable ring tone, or by voice readout of the identification of the message sender.

It is to be appreciated that in some exemplary embodiments of the invention the notification 110 includes an indication that a response is requested, thereby making the message different from a message in which a response is not specifically requested.

In some embodiments of the invention, such as the exemplary embodiment depicted by FIG. 2A, a single action is required from a user, the recipient, in order to activate the sender-defined response, thereby sending a response.

One feature of exemplary embodiments of the invention, which enables rapid message response, is activating sending a response based on a single action. One click, or one voice command, and the response is sent.

Another feature of exemplary embodiments of the invention, which enables rapid message response, is enabling the user to activate the single action input based on just receiving the message, before opening the message. The viewer can respond based on just receiving the message, or based on just viewing the notification 110 that a message has been received.

The user receives the message, and is appraised according to some convention that a response is requested. The user optionally selects the response, and the selection activates sending the response, with no further input requested of the user.

In some exemplary embodiments of the invention the ACK 205 option is replaced by a REPLY option (not shown), which takes the user to a reply screen without displaying the message to the user. As described above, the user may desire to respond rapidly, even before reading the message, and the user in the case performs the response using the cellular telephone's REPLY option. The REPLY option may require more than one key stroke, but still saves reading the message, when the user does not require reading the message.

In some embodiments of the invention, the REPLY option is not a standard cellular telephone REPLY option, but a reply option comprising additional functionality. The additional functionality optionally includes performing a specific action if the recipient enters a suitable code. The specific action optionally includes sending the response to a third party, that is, a party other than the sender. The third party is optionally identified within the message.

In some embodiments of the invention the recipient views the notification 110 that a message has been received, and is permitted to open the message only after identifying that the recipient is an intended recipient. In some embodiments of the invention, the identifying information is optionally sent to the sender for identification. In other embodiments of the invention, the identifying information is optionally sent together with the response to the message.

In some embodiments of the invention the recipient is optionally identified by using a Personal Identification Code (PIN). In other embodiments of the invention the recipient is optionally identified by using biometric identification.

In some exemplary embodiments of the invention the recipient performs an authentication that he or she is the recipient by entering a Personal Identification Code (PIN). In other exemplary embodiments of the invention the recipient performs the authentication using a biometric identification device, such as, by way of a non-limiting example, a fingerprint scanner, or voice print recognition. Such devices are becoming prevalent in laptop computers, and are therefore suitable for identifiable rapid response to emails. In addition, telephones have microphones, and therefore can perform voice print recognition. It is expected that during the life of a patent maturing from this application other messaging devices will include biometric identification, and will therefore employ biometric identification for performing identifiable responses.

In some exemplary embodiments of the invention, when the receiving apparatus is a touch screen enabled apparatus, the key press is replaced by an actuation of the touch screen. In other exemplary embodiments of the invention, when the receiving apparatus comprises a mouse, the key press is replaced by mouse click. In yet other exemplary embodiments of the invention, when the receiving apparatus is voice-command enabled, the key press is replaced by a voice command.

It is to be appreciated that in some exemplary embodiments of the invention, responding to a message is performed according to a convention which is suitable for the receiving apparatus.

Some exemplary embodiments of the invention implement enabling the response by configuring software resident at the receiving apparatus to enable a user to indicate a response and to produce the response.

Some exemplary embodiments of the invention produce a single response.

Some exemplary embodiments of the invention are configured to produce a single response from a choice of more than one response. Such an embodiment will be described below, with reference to FIG. 2B.

In some exemplary embodiments of the invention, sending the response is performed by software such as, by way of a non-limiting example, a script, or a widget configured in the receiving apparatus, based, at least partly, on the sender-defined response included in the received message.

In some exemplary embodiments of the invention preparing a response is enabled by receiving software, such as, by way of a non-limiting example a script or a widget sent with the message, and running the received software at the receiving apparatus.

In some embodiments of the invention the response is optionally sent back to the sender. In other embodiments of the invention the response is optionally sent to additional recipients. The additional recipients are optionally identified in the message as recipients for the response. The response may optionally be sent only to the additional recipients and not to the sender.

Figure 2B:
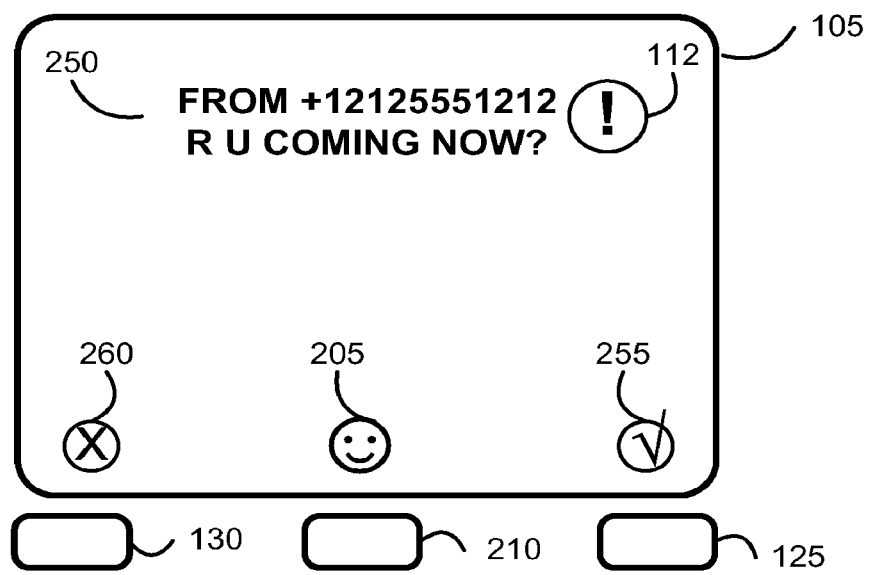
FIG. 2B is a simplified pictorial illustration of a cellular telephone screen showing a notification that a message has been received according to a system constructed and operative in accordance with an exemplary embodiment of the present invention.

Reference is now made to FIG. 2B, which is a simplified pictorial illustration of a cellular telephone screen 105 showing a notification 250 that a message has been received according to a system constructed and operative in accordance with an exemplary embodiment of the present invention.

The notification 250 conveys the fact that a message has been received, from which sender, and a message subject or a message title. The sender is identified by a phone number or by a name. Shrewd users of the embodiment of the invention which is depicted in FIG. 2B pack the gist of their message into the message subject, thereby assisting the recipient in making a response without reading the full message.

The optional flag 112 of FIG. 2A is also depicted, drawing attention to the fact that the received message contains a pre-defined response.

By way of a non-limiting example, a full message may be: "Are you coming now to the office party at Warner Park?" The sender, using an embodiment of the present invention, defines a message identifier as follows: "R U coming now?" knowing that the recipient will identify the sender as being from ⓥ ⓧ the office, and therefore the recipient will understand the full question from the summary, and be able to respond. The sender optionally defines the responses by selecting from a list, for example comprising "YES" and "NO", or icons. In some embodiments of the invention the sender defines the responses as text, for example comprising "YES", "NO", and "LATER" ⓥ ⓧ ☺, or "YES", "NO", and "ACK" ⓥ ⓧ ☺.

The options before the recipient are broader than those depicted in FIG. 2A, being YES 255, NO 260, and ACK 205, corresponding to first key 125, second key 130, and third key 210 respectively.

The meaning of responding YES 255 and NO 260 is self-evident. The third option of ACK 205 is provided for the recipient to respond that the message was received, and acknowledged, but the answer is not a yes or a no. Such situations happen sometimes.

In the exemplary embodiment depicted by FIG. 2A, use of the first key 125 and the second key 130 remain as in the prior art example depicted in FIG. 1A. In the exemplary embodiment depicted by FIG. 2B the first key 125 and the second key 130 are also used for implementing rapid response.

Some embodiments of the invention use one of the keys 260 205 120 as a MENU key (not shown). Pressing the MENU key opens a menu of options for response, and the recipient selects a response from the menu and sends it. In some embodiments, the MENU key is optionally a navigation key comprised in the cellular telephone.

A non-limiting list of example responses according to exemplary embodiments of the invention is hereby included:

a please-call-me response, which, when the receiving user activates the response, calls the sender using the receiving user's device, associated with an icon of a telephone;

an ACK of receiving a message;

an ACK of reading a message;

a YES or a NO to a question included in the message;

a YES or a NO to a question included in a title of the message;

a YES or a NO to a question included in a message indication;

an authorization to perform a transaction;

a custom response produced by the sender of the message;

a custom response produced by the recipient of the message;

a recording of an MMS message initiated by the received message;

a recording of a voice mail message into the sender's voice mail box, initiated by the received message;

an answer to a third party, such as the additional recipient described above; and an authorization to send a message to a third party.

By way of a non-limiting example, in case of a message indicating CALL ME, four or more responses are optionally provided: YES, NO, LATER, and an immediate call made to the sender based on the sender's phone number.

In some embodiments of the invention making an immediate call made to the sender based on the sender's phone number includes automatically performing a series of actions comprising exiting a messaging application, storing or caching the sender's phone number in the recipient's handset, and activating a calling application on the recipient's handset to make the call.

The immediate call made to the sender is optionally an immediate call to a phone number defined in the pre-defined response, which is the sender's voice mail, thereby enabling the recipient to make a voice recording of a response.

Figure 3:
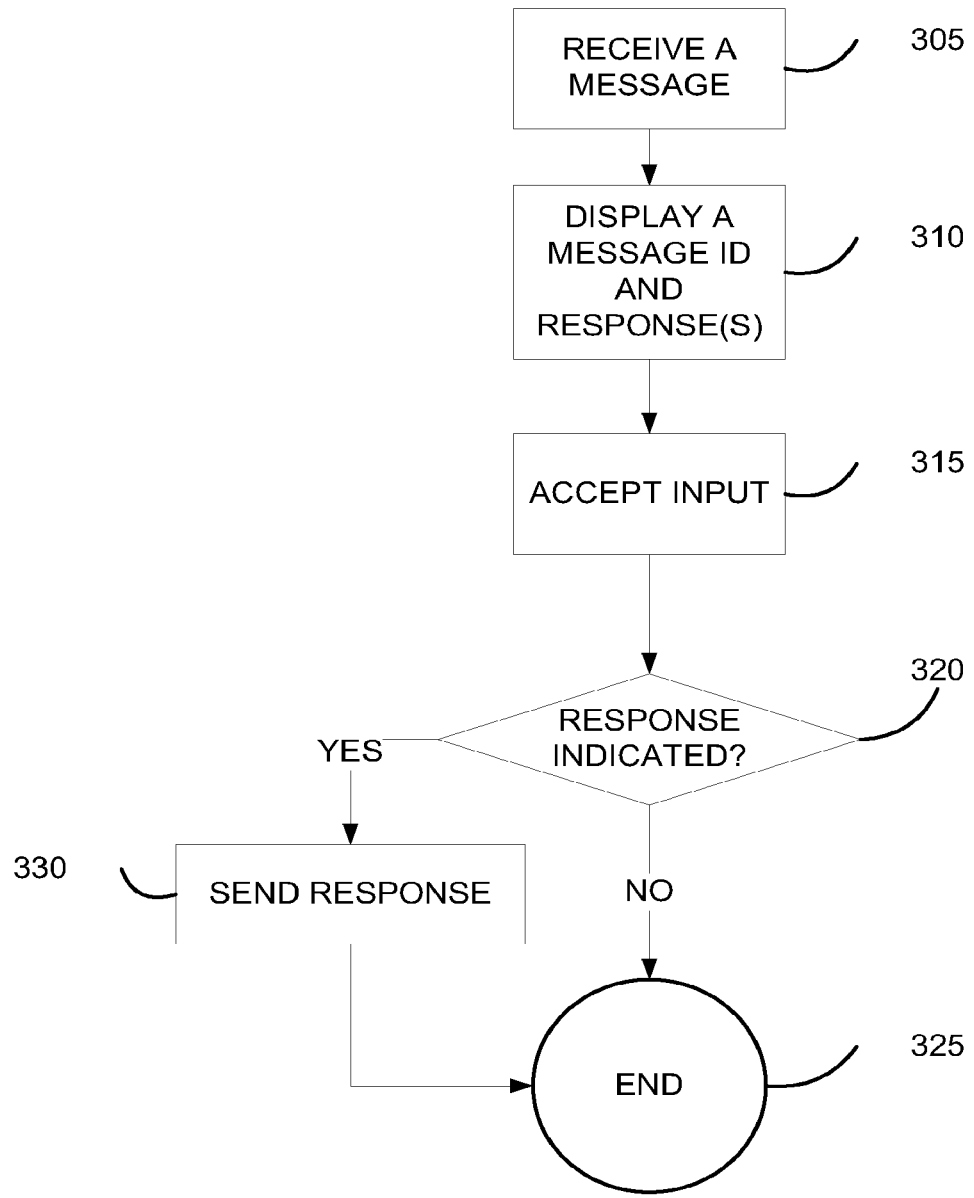
FIG. 3 is a flow diagram of a method for a receiver to respond to a message according to an exemplary embodiment of the invention.

Reference is now made to FIG. 3, which is a flow diagram of a method for a receiver to respond to a message according to an exemplary embodiment of the invention.

When the receiver receives a message (305), the receiver displays a message identifier and a possible response or responses (310). When the user inputs an input to the receiver, the receiver accepts the input (315), and checks whether sending a response is indicated (320).

If sending a response is indicated, then the receiver sends the response (330) and thereby reaches an end (325) of the flow of the method.

If sending a response is not indicated, the receiver also reaches the end (325) of the flow of the method. In some embodiments of the invention if sending a response is not indicated, the receiver performs whatever action the input indicated, and the method next returns (not shown) to accepting a next input (315).

In some embodiments of the invention, if the recipient did not indicate sending a response, that is, did not perform the activation, after a pre-defined period of time the receiver performs the activation and sends a default response. The default response is optionally a response which means no-response according to a suitable convention.

Some embodiments of the present invention enable a sender to track responses to messages.

Some embodiments of the present invention receive the responses, and display the responses as they are received.

Figure 4A:
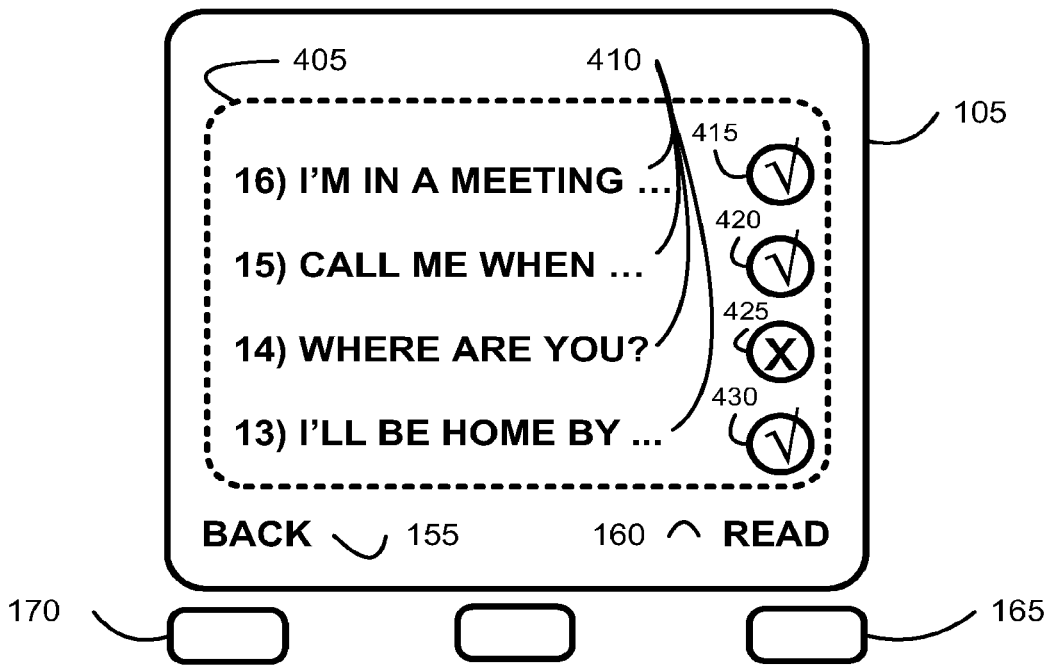
FIG. 4A is a simplified pictorial illustration of a cellular telephone screen showing a list of sent messages according to a system constructed and operative in accordance with an exemplary embodiment of the present invention.

Reference is now made to FIG. 4A, which is a simplified pictorial illustration of a cellular telephone screen 105 showing a list of sent messages 405 according to a system constructed and operative in accordance with an exemplary embodiment of the present invention.

FIG. 4A also depicts the optional actions BACK 155 and READ 160 and the associated first key 165 and second key 170, similarly to the depiction of FIG. 1B.

Each entry in the list of sent messages 405 comprises a message identifier 410 associated with a response identifier 415 420 425 430.

The message identifier 410 preferably comprises information which identifies a sent message in the mind of the sender. By way of a non-limiting example, the message identifier 410 can be the first few characters of the message; the phone number of the recipient of the message; a header of the message; a title of the message; an e-mail address of the recipient of the message; and so on.

The response identifiers 415 420 425 430 comprise information which identifies a response in the mind of the sender. FIG. 4A depicts icons as ⓥ Ⓧ response identifiers 415 420 425 430. The response identifiers 415 420 and 430 depict a message which has been acknowledged, and the response identifier 425 depicts a message which has not been acknowledged. Thus FIG. 4A corresponds to responses made by the cellular telephone of FIG. 2A, which was depicted as having an ACK 205 option.

In some embodiments of the invention the sender optionally selects a message identifier, or a response identifier, in order to optionally further expand the response. The further expansion enables the sender to read the response, if the response includes more information.

The response identifiers 415 420 425 430 optionally comprise a timestamp (not shown) indicating when the responses were made and/or received.

In some embodiments of the invention the recipient selects a response and enters a screen displaying a full response, thereby being enabled to receive more than the response identifiers 415 420 425 430.

In some embodiments of the invention the list of sent messages 405 is included in a specific box of response-requested messages, similar to other boxes such as an inbox, a draft box, an outbox, and so on.

In some embodiments of the invention the sender's device optionally identifies the incoming response as a response to a message rather than another type of incoming message. The sender's device thereby enables display of the response message as a response to a sent message, either in addition to display as an incoming message or in place of display as an incoming message.

Figure 4B:
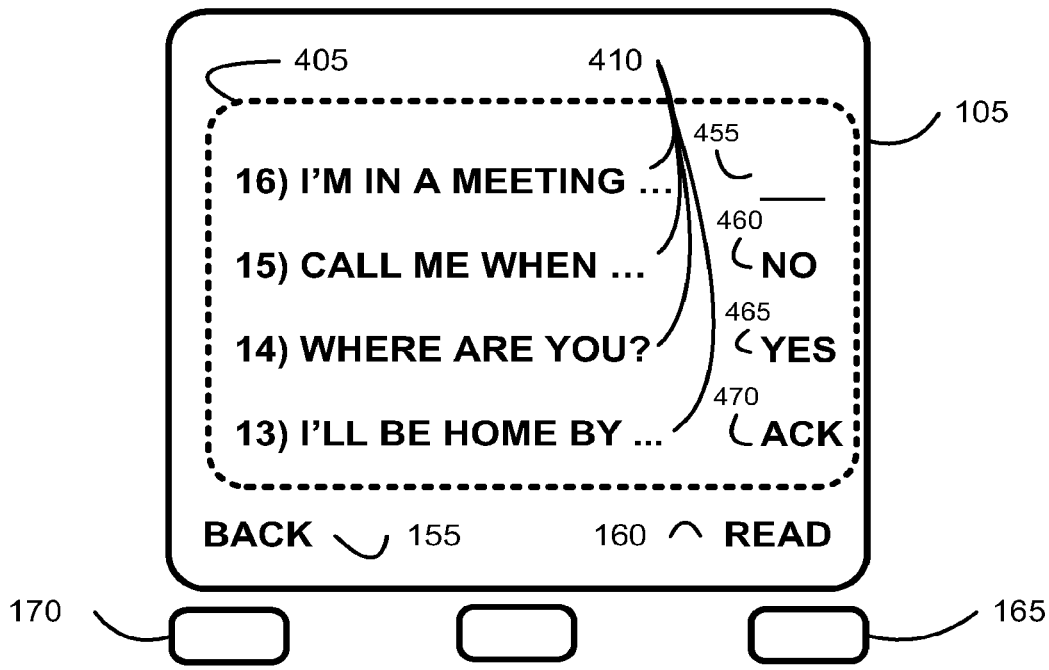
FIG. 4B is a simplified pictorial illustration of a cellular telephone screen showing a list of sent messages according to a system constructed and operative in accordance with an exemplary embodiment of the present invention.

Reference is now made to FIG. 4B, which is a simplified pictorial illustration of a cellular telephone screen 105 showing a list of sent messages 405 according to a system constructed and operative in accordance with an exemplary embodiment of the present invention.

FIG. 4B also depicts the optional actions BACK 155 and READ 160 and the associated first key 165 and second key 170, similarly to the depiction of FIGS. 4A and 1B.

Each entry in the list of sent messages 405 comprises a message identifier 410 associated with a response identifier 455 460 465 470.

The message identifier 410 preferably comprises information which identifies a sent message in the mind of the sender, as stated above with reference to FIG. 4A. The response identifiers 455 460 465 470 preferably comprise information which identifies a response in the mind of the sender, also as stated above with reference to FIG. 4A.

FIG. 4B depicts text as response identifiers 455 460 465 470. The response identifier 455 corresponds to a message which has not received a response, the response identifier 460 corresponds to a message which has received a NO response, the response identifier 465 corresponds to a message which has received a YES response, and the response identifier 470 corresponds to a message which has received an ACK response. Thus FIG. 4B corresponds to responses made by the cellular telephone of FIG. 2B, which was depicted as having three response options: NO 260; ACK 205; and YES 255.

In some embodiments of the invention the response identifiers 455 460 465 470 are not text, but icons. An example of response identifiers comprising icons is described below with reference to FIG. 5C.

It is to be appreciated that placing a message identifier and a response identifier together unifies functions presently performed by a separate outbox and inbox, grouping the message identifier and a response identifier together into a "conversation".

In some embodiments of the invention additional functional groups are optionally produced by the sender. One such functional group is a group of messages to which responses have not been received. Another such functional group is a history of messages and responses grouped by recipient.

In some embodiments of the invention the sender automatically produces an alert indicating a message to which a response has not been received within a specified time.

In some embodiments of the invention the sender automatically resends a message to which a response has not been received within a specified time.

In some embodiments of the invention a list is maintained of messages which have not been responded to, or which not all recipients have responded to.

In some embodiments of the invention a list is maintained of recipients to response-requested messages and a response status associated with each of the recipients and each of the messages sent to the recipient.

Figure 5A:
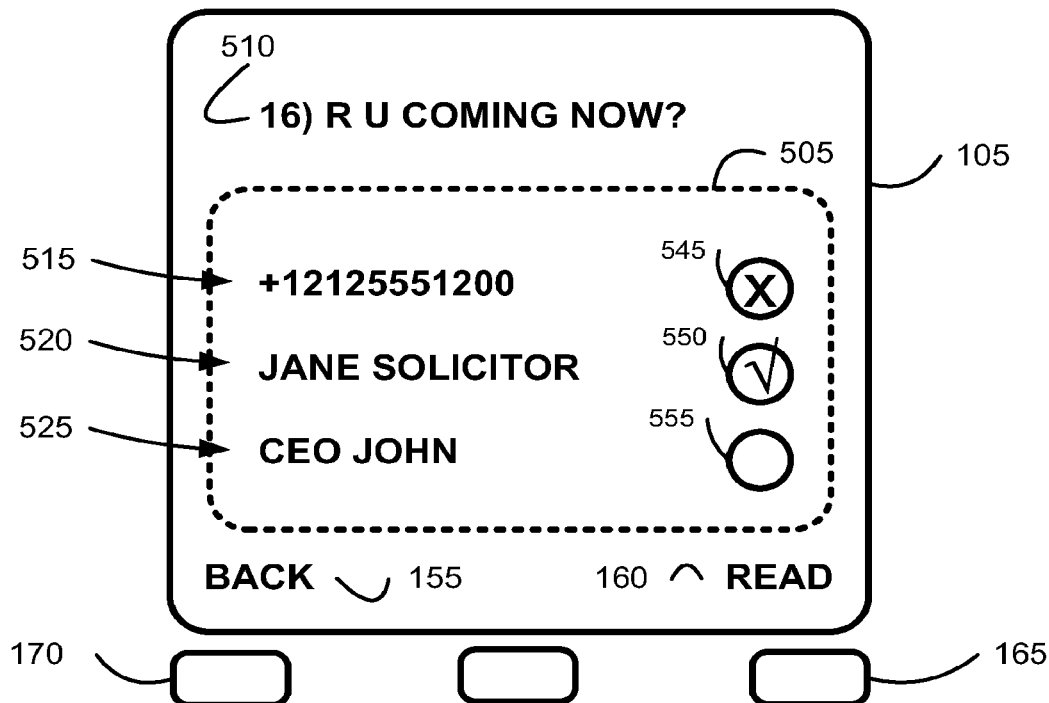
FIG. 5A is a simplified pictorial illustration of a cellular telephone screen showing a list of responses to a sent message according to a system constructed and operative in accordance with an exemplary embodiment of the present invention.

Reference is now made to FIG. 5A, which is a simplified pictorial illustration of a cellular telephone screen 105 showing a list of responses 505 to a sent message 510 according to a system constructed and operative in accordance with an exemplary embodiment of the present invention.

FIG. 5A also depicts the optional actions BACK 155 and READ 160 and the associated first key 165 and second key 170, similarly to the depiction of FIGS. 4A, 4B, and 1B.

Each of the list of responses 505 comprises a recipient identifier 515 520 525 and a response identifier 545 550 555 which indicates whether a recipient responded to the message.

The recipient identifiers 515 520 525 preferably comprise information which identifies a recipient in the mind of the sender. In some embodiments of the invention the recipient identifiers 515 520 525 comprise phone numbers of the recipients, and/or names of the recipients. In other embodiments of the invention the recipient identifiers 515 520 525 are email addresses of the recipients.

In some embodiments of the invention the indication of whether the recipient responded to the message is an icon. By way of a non-limiting example, the icon can be a check mark √ for a recipient which has responded, and an X mark for a recipient which has not responded.

In other embodiments of the invention, as depicted in FIG. 5A, the indication of whether the recipient responded to the message also comprises an indication of the response. By way of a non-limiting example, the response identifiers 545 550 and 555 comprise a response identifier 545 indicating a NO response, a response identifier 550 indicating a YES response, and a response identifier 555 indicating no response has been received.

In some embodiments of the invention, the response identifier 555, which indicates that no response has been received, also indicates how much time has passed without response since the message was sent. The indicating how much time has passed is a visual indication according to some suitable convention of time passing. Some non-limiting examples are: indicating time as two hands in a circle defining a clock face; indicating time, for example hours and minutes, as a digital count; coloring the response identifier 555 green corresponding to a short time without response, gradually turning to red for a long time without response.

Thus FIG. 5A corresponds to responses made by the cellular telephone of FIG. 2B, which was depicted as having three response options: NO 260; ACK 205; and YES 255. It is to be appreciated that since no response is also possible, the cellular telephone of FIG. 5A is enabled to display four types of responses.

Figure 5B:
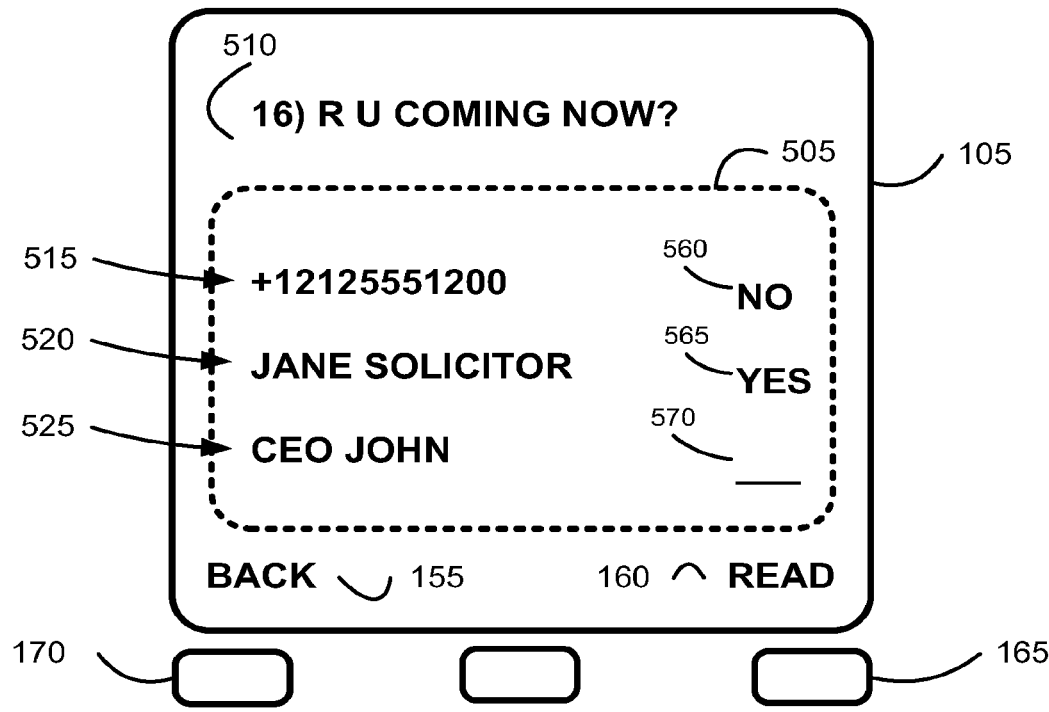
FIG. 5B is a simplified pictorial illustration of a cellular telephone screen showing a list of responses to a sent message according to a system constructed and operative in accordance with an exemplary embodiment of the present invention.

Reference is now made to FIG. 5B, which is a simplified pictorial illustration of a cellular telephone screen 105 showing a list of responses 505 to a sent message 510 according to a system constructed and operative in accordance with an exemplary embodiment of the present invention.

FIG. 5B depicts a similar exemplary embodiment of the invention as FIG. 5A, except that the indications comprise text indications 560 565 and 570. The indications 560 565 and 570 comprise, respectively, an indication of a NO (260) response, a YES (255) response, and no response having been received.

Thus FIG. 5B also corresponds to responses made by the cellular telephone of FIG. 2B, which was depicted as having three response options: NO 260; ACK 205; and YES 255. It is to be appreciated that since no response is also possible, the cellular telephone of FIG. 5B is enabled to display four types of responses.

Figure 5C:
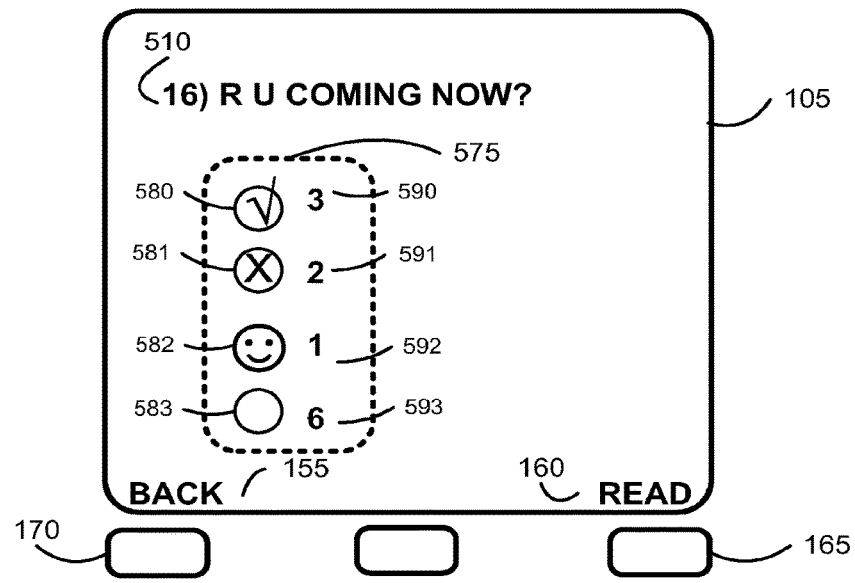
FIG. 5C is a simplified pictorial illustration of a cellular telephone screen showing a summary of responses to a sent message according to a system constructed and operative in accordance with an exemplary embodiment of the present invention.

Reference is now made to FIG. 5C, which is a simplified pictorial illustration of a cellular telephone screen 105 showing a summary of responses 575 to a sent message 510 according to a system constructed and operative in accordance with an exemplary embodiment of the present invention.

FIG. 5C also depicts the optional actions BACK 155 and READ 160 and the associated first key 165 and second key 170, similarly to the depiction of FIGS. 4A, 4B, 5A, 5B, and 1B.

The cellular telephone screen 105 also depicts the summary of responses 575, comprising possible responses 580 581 582 583 ⓨ ⓝ ☺ ○ of the sent message 510, and counts 590 591 592 593 of how many responses of each of the possible responses 580 581 582 583 were received. By way of the example depicted in FIG. 5C, there were 3 (590) YES ⓨ (580) responses, 2 (591) NO ⓝ (581) responses, 1 (592) ACK ☺ (582) response, and 6 (593) responses have not yet been received ○ (583) to the sent message.

Thus FIG. 5C also corresponds to responses made by the cellular telephone of FIG. 2B, which was depicted as having three response options: NO 260; ACK 205; and YES 255.

It is to be appreciated that the transmitter optionally sends more than one message requiring a response, therefore some embodiments of the invention optionally display a table (not shown), of how many responses were received for each one of the messages requiring a response.

Other embodiments of the invention optionally display a table (not shown) of how many responses were received of each type of response for each one of the messages requiring a response Still other embodiments of the invention optionally display a table (not shown) of a response identifier for each message/recipient combination. The response identifier comprises a recipient identifier and an identifier of the type of response.

It is to be appreciated that a present day cellular telephone screen is typically small, and examples depicting cellular telephone screens are typically constrained in the number of lines per screen and characters per screen. Exemplary embodiments with emails as the messages are typically displayed on larger screens, therefore the transmitter can easily display larger lists of responses, and tables of responses. Cellular telephone screens are presently growing in size and resolution, and it is expected that during the life of a patent maturing from this application cellular telephone screens will display larger lists of responses, and tables of responses than were depicted in FIGS. 5A-5C.

Figure 5D:
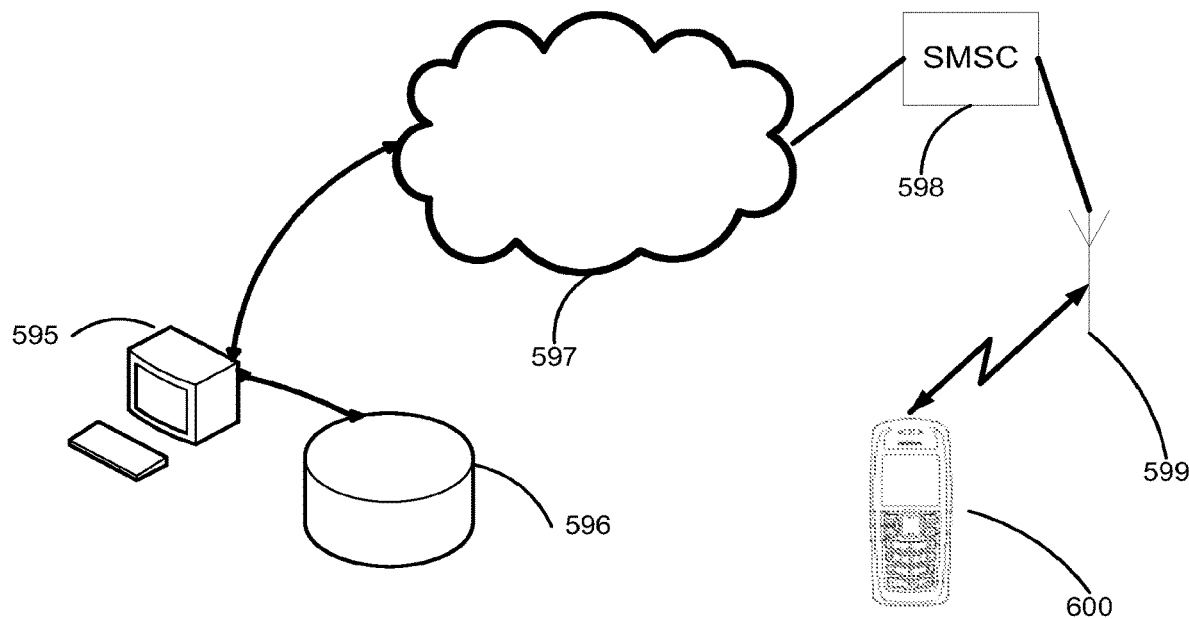
FIG. 5D is a simplified pictorial illustration of a system for tracking responses to sent messages constructed and operative in accordance with an exemplary embodiment of the present invention.

Reference is now made to FIG. 5D, which is a simplified pictorial illustration of a system for tracking responses to sent messages constructed and operative in accordance with an exemplary embodiment of the present invention;

The system of FIG. 5D comprises a computer 595 with storage 596, connected to an SMS Center (SMSC) 598 via the Internet 597. The SMSC 598 transmits messages via a cellular antenna 599 to a recipient handset 600.

The computer 595 comprises a centralized messaging system, composing messages as described below with reference to FIGS. 7 and 8, and tracking the messages as described above with reference to FIGS. 4A, 4B, 5A, 5B, and 5C.

The messaging service provider can be any suitable messaging service provider, such as, by way of a non-limiting example, a cellular telephone provider providing an SMS service, an Internet Service Provider providing email and instant messaging connections, and so on.

The connection to the messaging service provider can be any suitable connection, such as, by way of a non-limiting example, a network connection, a wireless network connection, a cellular network connection, and so on.

The computer 595 can be located in any suitable location, such as, by way of a non-limiting example, a person's home, a commercial location sending out messages and tracking them, a call center, and a messaging service provider's site.

The system of FIG. 5D is useful for centralized sending of messages and tracking of responses, and for sending messages and tracking of responses by computer, as described below with reference to Exemplary Uses of the System.

The above example embodiment included a computer sending SMS messages containing pre-defined responses. A computer can also be the recipient of a message, such as an SMS message, containing a pre-defined response. The message can be sent to a phone number which has automated answering. In some embodiments of the present invention, a computer receives messages pre-defined responses, detects the existence of the pre-defined responses, and responds to the messages. The response of the computer can be by activating the pre-defined response, be responding with a messages which contains a pre-defined response produced by the computer, and by any other suitable means, such as text, synthesized voice, and so on. In some embodiments of the invention, a computer responding to a message indicates that the response is produced by the computer and not by a human. The indication is by sending a suitable graphical icon, a suitable text message, and other such responses as are described herein.

Figure 6:
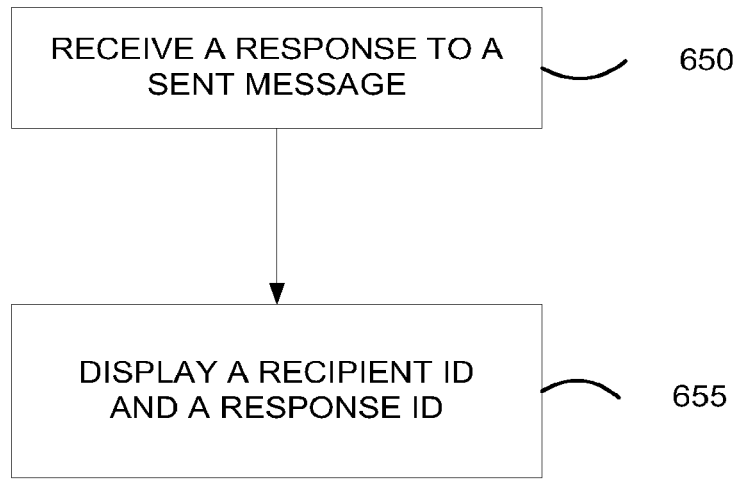
FIG. 6 is a flow diagram of a method for a sender to track responses to sent messages according to an exemplary embodiment of the invention.

Reference is now made to FIG. 6, which is a flow diagram of a method for a sender to track responses to sent messages according to an exemplary embodiment of the invention.

The method of FIG. 6 includes receiving a response to a sent message (650), and displaying a recipient identifier which identifies a recipient of the message together with a response identifier which identifies the recipient's response (655).

As described above with reference to FIGS. 4A, 4B, 5A, 5B, and 5C, the response identifier is displayed according to a suitable convention, such as icons, text, and so on.

The method of FIG. 6 is also described in the above discussion of FIGS. 5A, 5B, and 5C.

In some embodiments of the invention, an ability to perform a rapid response to a received message is comprised in a client at the receiver, without the received message comprising an indication that a response is desired. The client is configured to enable a rapid response to any kind of message, including a message for which the sender did not define a response.

In some embodiments of the invention, the ability to perform a rapid response to a received message is comprised in a client at the receiver, and comprises an ability to receive an indication, a hint, or a directive comprised in the received message, that a response is desired. A description of producing a message comprising an indication that a response is desired is provided below.

In some embodiments of the invention, the ability to perform a rapid response to a received message is comprised in executable code sent with the message to a client at the receiver. When the recipient activates the response, the recipient actually causes the receiver to execute the executable code, thereby causing the sending of the response.

Persons skilled in the art will appreciate that running executable code is already enabled in many cellular telephones. By way of a non-limiting example, many cellular telephones have Java Virtual Machines, and run Java code.

Figure 7:
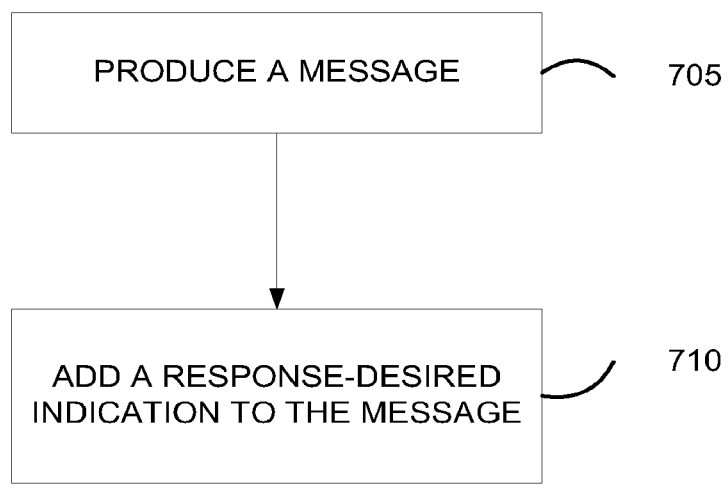
FIG. 7 is a flow diagram of a method for producing a message enabled for rapid response according to an exemplary embodiment of the invention.

Reference is now made to FIG. 7, which is a flow diagram of a method for producing a message enabled for rapid response according to an exemplary embodiment of the invention.

A person desiring to transmit a message for which a rapid response is desired produces a message (705), and adds an indication to the message that a response is desired. (710).

The message is optionally any type of message, such as SMS messages to cellular telephones, email messages, and other types as described above.

The person optionally adds the indication from a choice of one or more indications. In some embodiments of the invention the choice is optionally available as a choice from a menu of indications. In other embodiments of the invention the choice is made by adding text using a specific convention, such as delimited text and/or text in a mark-up language, as will be described below.

In some embodiments of the present invention the pre-defined recipient response is included within a standard SMS message. The predefined recipient response is included within one or more of the SMS fields according to the current SMS standard.

In some embodiments of the present invention the SMS protocol is enhanced, including changes which support transport of the predefined recipient response within an enhanced protocol SMS message and detection of the pre-defined recipient response within the enhanced protocol SMS message.

In some embodiments of the invention the SMS protocol is enhanced by adding a field to carry the predefined response or responses. In some embodiments of the invention the SMS protocol is enhanced by adding a flag to indicate that the SMS message contains the predefined response or responses.

In some embodiments of the invention the message enabled for rapid response is produced by enhanced native messaging software, such as, by way of example, enhanced native SMS client software. The enhanced native SMS client software is provided with an ability to produce pre-defined responses, to include the responses in SMS messages, and to detect messages enabled for rapid response when received. The enhanced native SMS client software processes a received message, and optionally causes a text part of the message to be displayed, a suitable response-requested indication to be displayed, such as the flag 112 of FIG. 2A, while hiding the actual bits of data which encoded the response-requested indication. The enhanced native SMS client software also optionally associates the response options, such as the ACK ☺ 205 of FIG. 2A, with suitable actions and with suitable keys, such as the third key 210 of FIG. 2A.

The enhanced native SMS client software is optionally downloaded to users, such as cellular telephone handsets, to replace previous native SMS client software and/or to patch previous native SMS client software.

In some embodiments of the invention the message enabled for rapid response is first produced as a standard message, such as, for example, a standard SMS message. The standard message is sent to an additional application, which produces a pre-defined response and inserts the pre-defined response into the message, thereby producing a message enabled for rapid response. The same additional application, or another additional application, detect messages enabled for rapid response when such messages are received, processes the received messages, and enables the rapid response features.

The additional application software is optionally downloaded to users, such as cellular telephone handsets.

In some embodiments of the invention some functionality for enabling sending and receiving rapid response enabled messages is provided by enhanced native messaging software, and some functionality by an additional application. By way of a non-limiting example, detection of messages enabled for rapid response, upon receipt, is made by the enhanced native messaging software, and production of the pre-defined response is made by additional software. Such a configuration enables correct handling of rapid response enabled messages, while enabling an updating of the additional application to update pre-defined responses, graphical indications for messages with pre-defined response, and so on.

Figure 8:
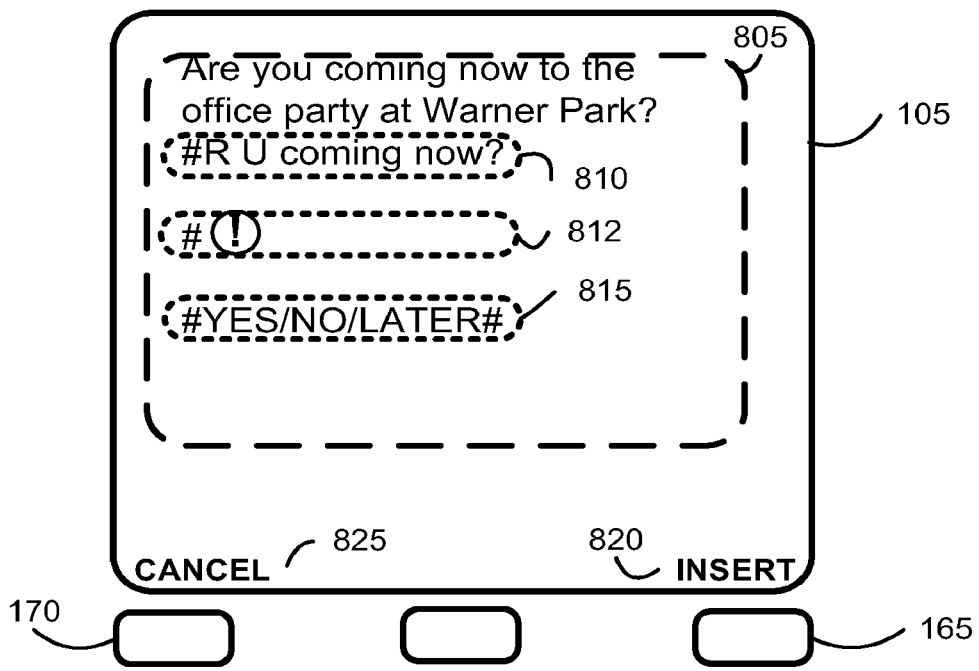
FIG. 8 is a simplified pictorial illustration of a sender's cellular telephone screen depicting a message composed with a choice of sender-defined responses comprising delimited text, according to a system constructed and operative in accordance with an exemplary embodiment of the present invention.

Reference is now made to FIG. 8, which is a simplified pictorial illustration of a cellular telephone screen including a message 805 composed with a choice of sender-defined responses comprising delimited text, according to a system constructed and operative in accordance with an exemplary embodiment of the present invention.

FIG. 8 also depicts optional actions INSERT 820 and CANCEL 825 and respectively associated first key 165 and second key 170. The optional action keys are associated with the editing actions of text insertion and canceling the editing session, as is known in the art.

The message 805, by way of the non-limiting example described above with reference to FIG. 2B, is "Are you coming now to the office party at Warner Park?" The sender, using an embodiment of the present invention, composes the message, and adds a message identifier 810 "R U coming now?" an optional flag ⓘ 812, and a sender-defined response 815 with the options "Yes/No/Later".

The message identifier 810, the optional flag ⓘ 812, and the sender-defined response 815, are added according to a pre-determined convention, such as, by way of a non-limiting example using a delimiter "#" to delimit between the message identifier 810, the optional flag ⓘ 812, and the sender-defined response 815, and using a delimiter "/" to delimit between response options.

In some embodiments of the invention the optional flag ⓘ 812 and the sender-defined response 815 are added by selection from a drop-down menu (not shown) of pre-defined optional flags and pre-defined sender-defined responses.

Figure 9:
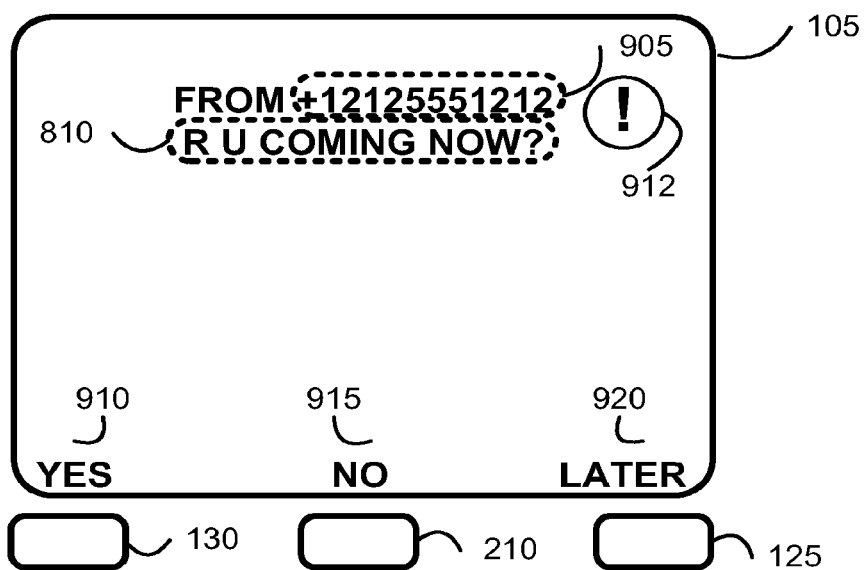
FIG. 9 is a simplified pictorial illustration of a recipient's cellular telephone screen depicting the message of FIG. 8 according to a system constructed and operative in accordance with an exemplary embodiment of the present invention.

Reference is now made to FIG. 9, which is a simplified pictorial illustration of a recipient's cellular telephone screen 105 depicting the message of FIG. 8 according to a system constructed and operative in accordance with an exemplary embodiment of the present invention.

A sender identifier 905 is displayed on the cellular telephone screen 105, along with the message identifier 810 (FIG. 8). A client program on the recipient's cellular telephone has parsed the received message, and caused the cellular telephone to display optional responses 910 915 920 corresponding to the sender-defined response 815. The optional responses are "YES" 910, corresponding to the second key 130, "NO" 915, corresponding to the third key 210, and "LATER", corresponding to the first key 125.

An optional flag ⓘ 912 is also displayed, corresponding to the optional flag ⓘ 812 comprised in the message in the system of FIG. 8.

In some embodiments of the invention the indication that a response is desired is optionally comprised in a response-desired field within the message. In other embodiments of the invention the indication that a response is desired is optionally comprised in a content field within the message, optionally together with other contents.

Expanding upon the embedding of the predefined recipient response within one or more of the SMS fields according to the current SMS standard, mentioned with reference to FIG. 7, it is noted that a standard SMS message according to the present invention may contain a standard text field, which is understood by a recipient, and also parsed by the above mentioned enhanced native SMS client software. By way of a non-limiting example, the SMS text includes: "R U COMING NOW? Reply Yes or No". A recipient having non-enhanced SMS client software can optionally read, understand, and respond to the above SMS by sending an SMS response of "Yes" or "No". A recipient having enhanced native SMS client software optionally reads the same message, but also optionally has the responses "Yes" and "No" appear as the optional responses 910 915. The enhanced native SMS client software optionally parses the SMS text, and causes the optional responses 910 915 to appear. When the user presses the keys 130 210 corresponding to the optional responses 910 915, the responses "Yes" or "No" are inserted into a response, and/or the responses "Yes" or "No" are sent.

In some embodiments of the invention when the user presses the keys 130 210 corresponding to the optional responses 910 915, the enhanced native SMS client software optionally replaces the text associated with the keys 130 210 with something else, such as the icons described above with reference to FIG. 2A, and/or replacing the text with different text. The enhanced native SMS client software optionally parses the SMS text and optionally uses at least some of the SMS text as a directive or script for execution.

In some embodiments of the invention the indication that a response is desired optionally comprises text. In some embodiments of the invention, the text indication that a response is desired is comprised in a message header or title, for a receiver to display to a user.

In other embodiments of the invention, the text indication that a response is desired is configured to be parsed and detected by a client program at a receiver.

In yet other embodiments of the invention, the text indication that a response is desired is configured to be parsed and detected by a client program at a receiver. The indication is optionally part of the message, with suitable delimiters to delimit the indication from the message. By way of a non-limiting example, text indication of three possible responses, YES, NO, and ACK, is sent as #Y/N/A#.

In some embodiments of the invention the indication that a response is desired optionally comprises text conforming to a mark-up language. By way of a non-limiting example, the mark-up language is XML.

In some embodiments of the invention, the indication that a response is desired is comprised in the message destination. The message destination, being a phone number in case of cellular telephones, is typically parsed by cellular telephone service providers, therefore the service providers should typically agree to support this form of indication.

In some embodiments of the invention the indication that a response is desired optionally comprises code, executable at the receiver.

In some embodiments of the invention the code optionally comprises a text messaging program.

In some embodiments of the invention the code is compiled by a composer of the message, in other embodiments of the invention the code is compiled by the receiver. In still other embodiments of the invention the code comprises a script to be optionally run by the receiver.

In some embodiments of the invention the code is configured for single-user-action execution, such as, by way of example, a single key activation, or a single voice command, and so on.

It is to be appreciated that in some embodiments of the invention sending a message comprising an indication that a response is desired from a transmitter to a receiver through intermediate stations optionally does not affect the indication.

It is to be appreciated that in other embodiments of the invention sending a message comprising an indication that a response is desired from a sender to a receiver through intermediate stations optionally changes the indication. Intermediate stations optionally perform translation of messages from a format composed by a sender to a format suitable for reception by a receiver. The translation of messages includes translation of response-desired indication from one format to another format.

Figure 10:
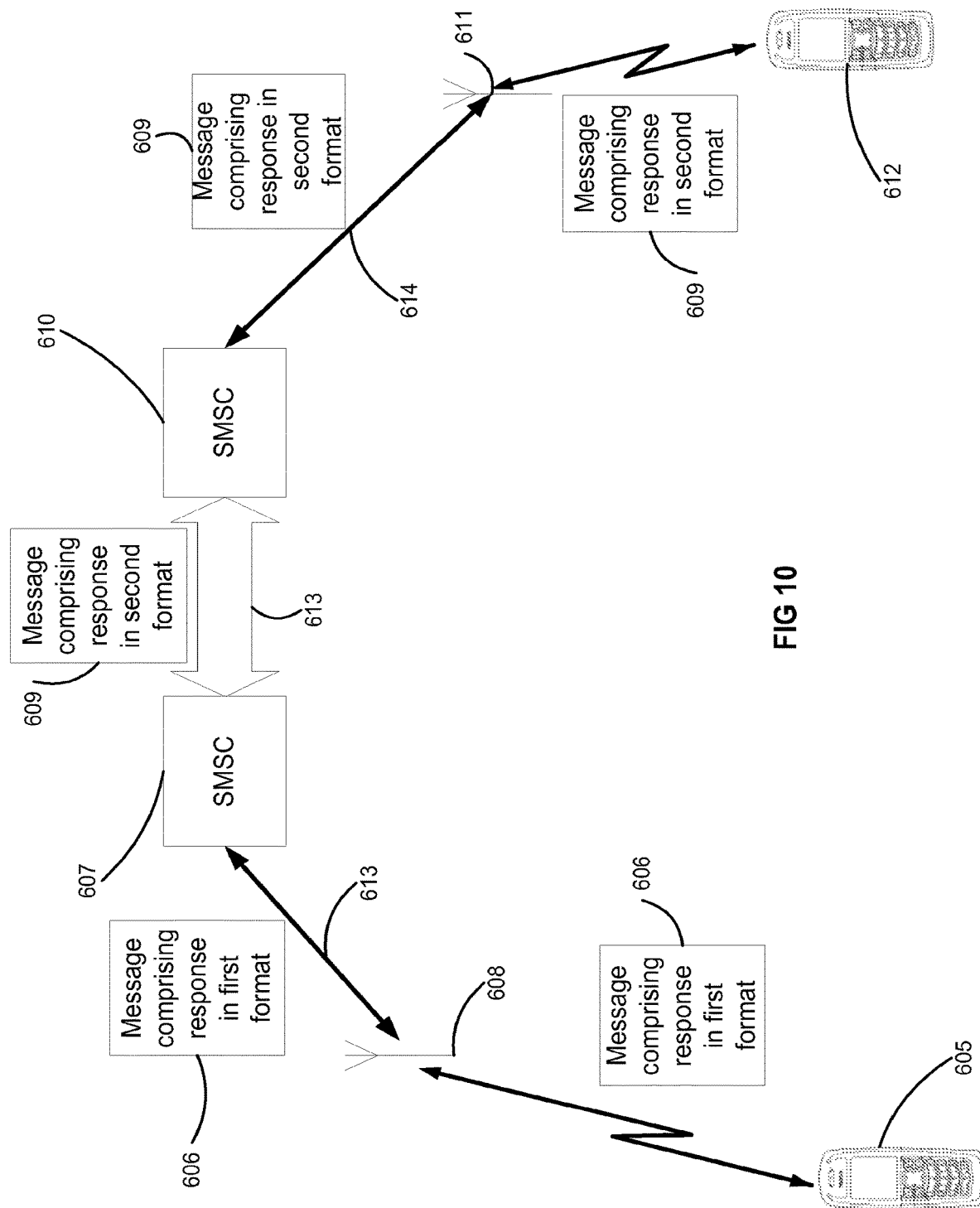
FIG. 10 is a simplified pictorial illustration of a system for two-way messaging between an originating user and a receiving user via two different messaging operators constructed and operative in accordance with an exemplary embodiment of the present invention.

Reference is now made to FIG. 10, which is a simplified pictorial illustration of a system for two-way messaging between an originating user and a receiving user via two different messaging operators constructed and operative in accordance with an exemplary embodiment of the present invention.

An originating user's handset 605 sends a message 606 comprising a response-desired indication in a first format, to a first cellular antenna 608 belonging to the originating user's messaging operator. The first cellular antenna 608 receives the message 606, and transmits the message 606 through suitable cellular network elements 613 to an SMSC 607 belonging to the originating user's messaging operator.

The SMSC 607 belonging to the originating user's messaging operator translates the response-desired indication in the first format comprised in the message 606 to a response-desired indication in a second format, producing a second message 609, comprising the response-desired indication in the second format, the second format being suitable for a receiving user's messaging operator. The SMSC 607 belonging to the originating user's messaging operator sends the second message 609 to an SMSC 610 belonging to the receiving user's messaging operator, using an inter-operator network 613. The SMSC 610 belonging to the receiving user's messaging operator sends the second message 609 through suitable cellular network elements 614 to a second cellular antenna 611 belonging to the receiving user's messaging operator.

The second cellular antenna 611 receives the second message 609, and transmits the second message 609 to the receiving user's handset 612.

When the receiving user's handset responds to the message in the second format 609, the reverse path serves to provide the response to the originating user's handset 605. The translation from a response-desired indication in the second format (not shown), to a response-desired indication in the first format optionally occurs in the SMSC 607 belonging to the originating user's messaging operator.

It is to be appreciated that in some embodiments of the invention the translation occurs in the SMSC 607, in some embodiments of the invention the translation occurs in the SMSC 610, and in some embodiments of the invention the translation occurs in a component of the inter-operator network 613. In some embodiments of the invention the translation occurs in add-on software, the software operating in one of the above mentioned SMSCs 607, 610 and/or the inter-operator network 613.

Exemplary Uses of the System

Non-limiting examples of uses of exemplary embodiments of the invention will now be described.

The enablement of sending short messages readable in receiving devices and respondable without opening a full message opens up possibilities such as BUY EGGS, COLLECT KID, LUNCH TODAY, SELL ACME STOCK, and so on. Some embodiments of the present invention use flags, or icons, to convey the above messages to the user receiving the messages.

Embodiments of the invention lend themselves particularly well to automatic message production by centralized servers, for example bank servers sending messages requiring authenticated responses. A similar system is described with reference to FIG. 5D. By way of a non-limiting example, authentication optionally uses either PIN numbers or voice recordings. The voice recordings are optionally sent either as voice responses over the cellular telephone, or as MMS messages comprising recorded voice.

A manager sending a message to his or her employees may use embodiments of the invention to obtain and manage acknowledgements, optionally authenticated acknowledgements, that the message has been received by the employees. That is to say, while prior art systems allow for replies, the present embodiments ensure that the current status of the message is known to the sender via a flag, even without the recipient having replied in conventional form of text content. Tracking responses in such a manner is exemplified in FIG. 5B, which depicts a list of indications 560 565 570 of responses next to recipient identifiers 515 520 525. Some embodiments of the invention list indications of responses in forms of icons, or flags.

A dentist or doctor automatically sending appointment reminders to patients may use embodiments of the invention to obtain and manage acknowledgements that the appointment reminders have been received by the patients.

The following scenario is enabled by the ability to trigger sending a message to a third party by responding to a received message: a first person receives a message from a second that document X is ready, and triggers sending document X to a third person. The sender sends prepared responses to the first person, including as one choice of response an "APPROVE" response. When the first person selects the "APPROVE" choice, the response is sent back to the sender, and when the response arrives at the sender, code is activated at the sender to send document X from the sender to the third person.

An additional scenario includes making a prepared transaction such as paying bills by sending a response to a received bill, the response authorizing the payment by a third party, such as a bank or Paypal. A cellular seller sends a "one-click" data segment to a cellular buyer. The data segment contains the buyer's relevant payment data, by way of a non-limiting example, credit card data, and the buyer's data, for example credit card merchant data, and a transaction identification. The data segment is sent as one choice of response corresponding to "APPROVE". When the buyer selects the "APPROVE" choice, the response is activated, sending to the credit card company data comprising an order to transfer funds from the buyer's account to the seller's account, in payment for the identified transaction.

Managing responses in lists associated with messages provides a management tool within an organization—enabling sending instructions and tracking their reception and performance.

A person sending a distress message may use embodiments of the invention to obtain an acknowledgement that the distress message has been received. By way of a non-limiting example, a person who messages for medical assistance, or a stranded motorist who messages for roadside assistance, may preset a response to go with the message.

Expanding upon the above mentioned enhanced native SMS client software, an example application is now described which uses an embodiment of the present invention.

Figure 11A:
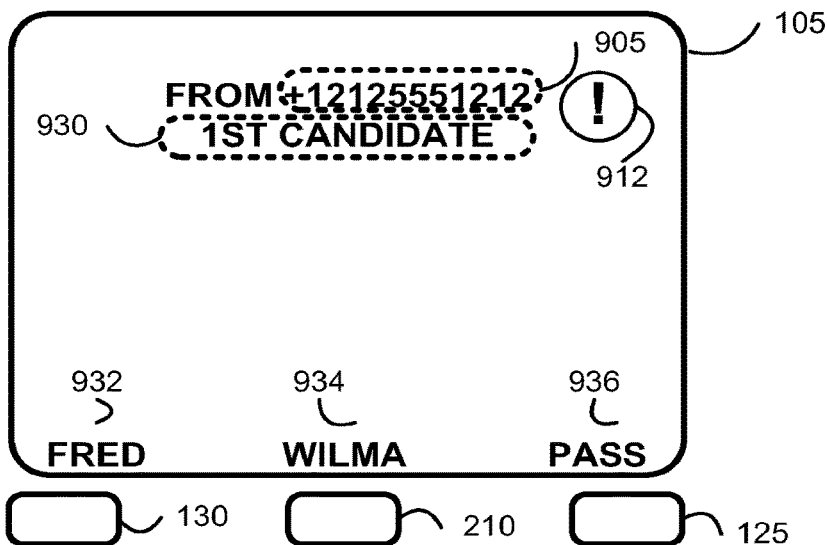
FIGS. 11A, 11B, and 11C are simplified pictorial illustrations of a recipient's cellular telephone screen depicting a gradual development of a message according to a system constructed and operative in accordance with an exemplary embodiment of the present invention.
Figure 11B:
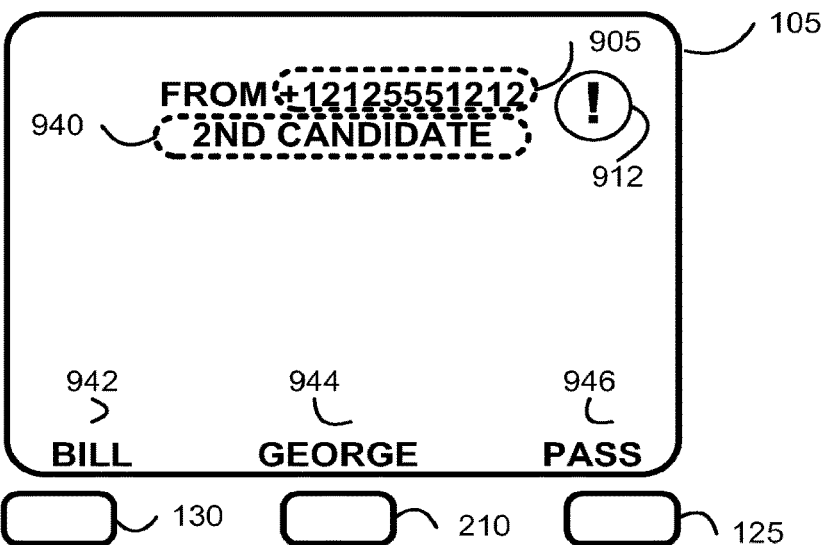
Figure 11C:
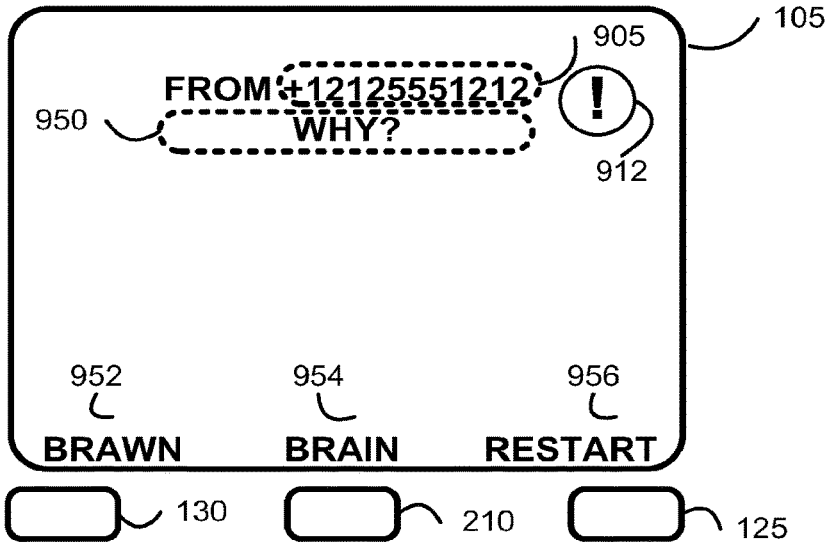

Reference is now made to FIGS. 11A, 11B, and 11C, which are simplified pictorial illustrations of a recipient's cellular telephone screen depicting a gradual development of a message according to a system constructed and operative in accordance with an exemplary embodiment of the present invention.

FIGS. 11A, 11B, and 11C depict a message produced according to the present invention.

FIG. 11A depicts a recipient's cellular telephone screen 105 similar to the recipient's cellular telephone screen depicted in FIG. 9 above. Reference numbers which have identical numbers refer to same features as in FIG. 9 above.

The message of FIGS. 11A, 11B, 11C displays gradually. By way of a non-limiting example, the message first displays a first multiple choice 930 such as a question or a voting choice, e.g. "1ST CANDIDATE" 930, displaying three choices: "FRED" 932, "WILMA" 934, and "PASS" 936. The three choices 932 934 936 correspond to the three keys 130 210 125.

FIG. 11B depicts what happens when the recipient presses one of the three keys 130 210 125: the enhanced native SMS client software displays an additional, second, multiple choice 940, and an additional set of choices "BILL" 942, "GEORGE" 944, and "PASS" 946. The three choices 942 944 946 correspond to the three keys 130 210 125.

The second multiple choice 940 question which is displayed optionally depends on a result of the choice of the recipient in the first multiple choice 930. By way of a non-limiting example, if the recipient chose "FRED" 932 in the first multiple choice, the second question may be "WHY?", with optional answers "BRAWN", "BRAIN", and "PASS"; and if the recipient chose "WILMA" 932 in the first multiple choice, the second question may again be "WHY?", with optional answers "WIT", "BEAUTY", and "PASS".

FIG. 11C depicts what happens when the recipient presses the key 130 which corresponds to the choice "FRED" 932. The enhanced native SMS client software displays an alternate second multiple choice 950, and an additional set of choices "BRAWN" 952, "BRAIN" 954, and "RESTART" 956.

The above described depictions in FIGS. 11A, 11B, 11C teach using the enhanced native SMS client software to display questions one at a time, and display additional questions included in the same SMS message after an answer has been provided. The additional questions optionally depend on the answers to prior questions.

At an end of a series of questions, the recipient's choices are sent as a response, to the sender and/or to some other pre-defined address.

It is expected that during the life of a patent maturing from this application many relevant messaging technologies will be developed and the scope of the terms message and response is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for displaying response information for a digital group message, comprising:
    constructing the digital group message, the digital group message including a script code and at least one predetermined recipient response for activation at each of a plurality of recipient devices;
    sending the constructed digital group message to the plurality of recipient devices, each recipient device not having the script code stored thereon, wherein the script code, when executed at one of the recipient devices, configures the recipient device to display at least a portion of the at least one predetermined activatable recipient response;
    determining, for each of the plurality of recipient devices, at least one response identifier, wherein each response identifier indicates at least a status of a response from the recipient device to the digital group message; and
    displaying the response identifiers.

2. The method of claim 1, wherein each response identifier further indicates at least one of: content of the response, a type of the response, a time when the response was made, and a time when the response was received.

3. The method of claim 1, further comprising:
    determining, for each of the plurality of recipient devices, a recipient identifier, wherein each recipient identifier indicates a recipient associated with the recipient device.

4. The method of claim 3, wherein each recipient identifier includes at least one of: a name of the associated recipient, a phone number of the associated recipient, and an email address of the associated recipient.

5. The method of claim 1, wherein each status is at least one of: that no response has been received, and that a response has been received.

6. The method of claim 5, wherein a response is received from a recipient device in response to activation of one of the at least one predetermined recipient response included in the sent digital message.

7. The method of claim 5, wherein each response identifier indicating a status that no response has been received further indicates an amount of time that has passed without response since the digital message was sent.

8. The method of claim 5, further comprising:
    determining, for each response identifier indicating a status that a response has been received, a type of the response;
    generating a table indicating a number of responses of each type; and
    displaying the generated table.

9. The method of claim 1, further comprising:
    determining, based on the determined response identifiers, at least one functional group, wherein each functional group is of a subset of the plurality of recipient devices.

10. A non-transitory computer readable medium having stored thereon instructions for causing a processing circuitry to perform a process for displaying response information for a digital group message, the process comprising:
    constructing the digital group message, the digital group message including a script code and at least one predetermined recipient response for activation at each of a plurality of recipient devices;

sending the constructed digital group message to the plurality of recipient devices, each recipient device not having the script code stored thereon, wherein the script code, when executed at one of the recipient devices, configures the recipient device to display at least a portion of the at least one predetermined activatable recipient response;

determining, for each of the plurality of recipient devices, at least one response identifier, wherein each response identifier indicates at least a status of a response from the recipient device to the digital message; and displaying the response identifiers.

11. A user terminal for displaying response information for a digital group message, comprising:

a processing circuitry; and a memory, the memory containing instructions that, when executed by the processing circuitry, configure the user terminal to:

construct the digital group message, the digital group message including a script code and at least one predetermined recipient response for activation at each of a plurality of recipient devices;

send the constructed digital group message to the plurality of recipient devices, each recipient device not having the script code stored thereon, wherein the script code, when executed at one of the recipient devices, configures the recipient device to display at least a portion of the at least one predetermined activatable recipient response;

determine, for each of the plurality of recipient devices, at least one response identifier, wherein each response identifier indicates at least a status of a response from the recipient device to the digital message; and display the response identifiers.

12. The user terminal of claim 11, wherein each response identifier further indicates at least one of: content of the response, a type of the response, a time when the response was made, and a time when the response was received.

13. The user terminal of claim 11, wherein the user terminal is further configured to:

determine, for each of the plurality of recipient devices, a recipient identifier, wherein each recipient identifier indicates a recipient associated with the recipient device.

14. The user terminal of claim 13, wherein each recipient identifier includes at least one of: a name of the associated recipient, a phone number of the associated recipient, and an email address of the associated recipient.

15. The user terminal of claim 11, wherein each status is at least one of: that no response has been received, and that a response has been received.

16. The user terminal of claim 15, wherein a response is received from a recipient device in response to activation of one of the at least one predetermined recipient response included in the sent digital message.

17. The user terminal of claim 15, wherein each response identifier indicating a status that no response has been received further indicates an amount of time that has passed without response since the digital message was sent.

18. The user terminal of claim 15, wherein the user terminal is further configured to:

determine, for each response identifier indicating a status that a response has been received, a type of the response;

generate a table, the table indicating a number of responses of each type; and display the generated table.

19. The user terminal of claim 11, wherein the user terminal is further configured to:

determine, based on the determined response identifiers, at least one functional group, wherein each functional group is of a subset of the plurality of recipient devices.

20. The method of claim 1, wherein the digital group message is sent via at least one of: cellular telephony, line telephony, satellite, cable, internet protocol network, Bluetooth, Worldwide Interoperability of Microwave Access (WiMax), Infrared, and a wireless network.

21. The user terminal of claim 11, wherein the user terminal is configured to send the digital group message via at least one of: cellular telephony, line telephony, satellite, cable, internet protocol network, Bluetooth, WiMax, Infrared, and a wireless network.

* * * * *